US011091043B2

(12) United States Patent
Wang

(10) Patent No.: US 11,091,043 B2
(45) Date of Patent: Aug. 17, 2021

(54) MULTI-ZONE BATTERY EXCHANGE SYSTEM

(71) Applicant: SZ DJI TECHNOLOGY Co., Ltd, Shenzhen (CN)

(72) Inventor: Mingyu Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 677 days.

(21) Appl. No.: 15/376,567

(22) Filed: Dec. 12, 2016

(65) Prior Publication Data

US 2017/0088288 A1 Mar. 30, 2017

Related U.S. Application Data

(63) Continuation of application No. 15/048,948, filed on Feb. 19, 2016, which is a continuation of application
(Continued)

(51) Int. Cl.
B60L 53/00 (2019.01)
B64D 39/00 (2006.01)
(Continued)

(52) U.S. Cl.
CPC .............. B60L 53/00 (2019.02); B60L 53/51 (2019.02); B60L 53/52 (2019.02); B60L 53/53 (2019.02); B60L 53/80 (2019.02); B64C 39/024 (2013.01); B64D 39/00 (2013.01); B64F 1/00 (2013.01); B64F 1/18 (2013.01); B64F 1/20 (2013.01); B64F 1/362 (2013.01); B64F 3/00 (2013.01);
(Continued)

(58) Field of Classification Search
CPC ......... B64D 39/00; Y02T 50/672; H02J 7/025
USPC ..................................................... 244/135 A
See application file for complete search history.

(56) References Cited

U.S. PATENT DOCUMENTS 4,700,912 A 10/1987 Corbett
4,795,957 A 1/1989 MacNeal et al.
(Continued)

FOREIGN PATENT DOCUMENTS

CN 101797978 A 8/2010
CN 101976731 A 2/2011
(Continued)

OTHER PUBLICATIONS

Nikhil Nigam et al., Control of Multiple UAVs for Persistent Surveillance: Algorithm and Flight Test Results, IEEE Transactions on Control Systems Technology, vol. 20, No. 5, Sep. 1, 2012, pp. 1236-1251.
(Continued)

Primary Examiner — Brian M O'Hara
Assistant Examiner — Keith L Dixon
(74) Attorney, Agent, or Firm — Anova Law Group, PLLC

(57) ABSTRACT

A multi-zone battery station is provided, comprising a plurality of landing areas configured to support a UAV. The battery station may permit battery life to be reloaded onto a UAV, which may include recharging a battery of the UAV or exchanging the UAV battery for a new battery. The different zones may accommodate different UAV types, different battery types, or operate in accordance with different energy provision rules. A marker may be provided on a landing area to aid in guiding the UAV to an appropriate landing area.

16 Claims, 15 Drawing Sheets

Related U.S. Application Data

No. 14/634,489, filed on Feb. 27, 2015, now Pat. No. 9,284,062, which is a continuation of application No. PCT/CN2014/083963, filed on Aug. 8, 2014.

(51) Int. Cl.

| | | |
|---|---|---|
| *B64C 39/02* | (2006.01) | |
| *B64F 1/00* | (2006.01) | |
| *B64F 3/00* | (2006.01) | |
| *B60L 53/80* | (2019.01) | |
| *B60L 53/51* | (2019.01) | |
| *B60L 53/52* | (2019.01) | |
| *B60L 53/53* | (2019.01) | |
| *B64F 1/18* | (2006.01) | |
| *B64F 1/36* | (2017.01) | |
| *G05D 1/00* | (2006.01) | |
| *B64F 1/20* | (2006.01) | |
| *G08G 5/00* | (2006.01) | |

(52) U.S. Cl.
CPC ......... *G05D 1/0011* (2013.01); *G08G 5/0043* (2013.01); *B64C 2201/042* (2013.01); *B64C 2201/066* (2013.01); *Y02T 50/60* (2013.01)

(56) References Cited

U.S. PATENT DOCUMENTS

| | | | |
|---|---|---|---|
| 5,936,184 A | 8/1999 | Majerus et al. | |
| 6,193,190 B1 | 2/2001 | Nance | |
| 6,604,706 B1 | 8/2003 | Bostan | |
| 6,688,755 B2 | 2/2004 | O'Meara | |
| 6,840,480 B2 | 1/2005 | Carroll | |
| 7,398,946 B1 * | 7/2008 | Marshall | B60L 53/11 244/58 |
| 7,714,536 B1 * | 5/2010 | Silberg | B64C 39/024 320/108 |
| 8,164,300 B2 * | 4/2012 | Agassi | B60L 50/64 320/104 |
| 8,511,606 B1 * | 8/2013 | Lutke | B64C 39/028 244/100 R |
| 8,725,330 B2 * | 5/2014 | Failing | B60L 3/00 701/22 |
| 8,876,057 B2 | 11/2014 | Alber et al. | |
| 8,880,241 B2 | 11/2014 | Mohamadi | |
| 9,139,310 B1 | 9/2015 | Wang | |
| 9,284,062 B2 | 3/2016 | Wang | |
| 9,346,560 B2 | 5/2016 | Wang | |
| 9,434,267 B2 | 9/2016 | Wang et al. | |
| 9,440,545 B2 | 9/2016 | Wang | |
| 9,550,582 B2 | 1/2017 | Wang et al. | |
| 2003/0208302 A1 | 11/2003 | Lemelson et al. | |
| 2004/0211862 A1 | 10/2004 | Elam | |
| 2006/0273749 A1 | 12/2006 | Im | |
| 2009/0140095 A1 | 6/2009 | Sirohi et al. | |
| 2011/0068224 A1 | 3/2011 | Kang et al. | |
| 2011/0071705 A1 | 3/2011 | Matuszeski et al. | |
| 2011/0106294 A1 | 5/2011 | Bebbington | |
| 2011/0301795 A1 | 12/2011 | Failing | |
| 2012/0126745 A1 * | 5/2012 | Partovi | H02J 7/0027 320/108 |
| 2013/0081245 A1 | 4/2013 | Vavrina et al. | |
| 2014/0032034 A1 | 1/2014 | Raptopoulos et al. | |
| 2014/0070052 A1 | 3/2014 | Kang | |
| 2014/0124621 A1 | 5/2014 | Godzdanker et al. | |
| 2014/0129059 A1 | 5/2014 | Scarlatti et al. | |
| 2014/0249741 A1 | 9/2014 | Levien et al. | |
| 2014/0303814 A1 | 10/2014 | Burema et al. | |
| 2014/0319272 A1 | 10/2014 | Casado et al. | |
| 2015/0134274 A1 | 5/2015 | Froom et al. | |
| 2015/0344136 A1 | 12/2015 | Dahlstrom | |
| 2016/0039300 A1 | 2/2016 | Wang et al. | |
| 2016/0039540 A1 | 2/2016 | Wang | |
| 2016/0039541 A1 | 2/2016 | Beardsley et al. | |
| 2016/0039542 A1 | 2/2016 | Wang | |
| 2016/0097851 A1 | 4/2016 | Zhang et al. | |
| 2016/0144734 A1 | 5/2016 | Wang et al. | |
| 2016/0167807 A1 | 6/2016 | Wang | |
| 2016/0236582 A1 | 8/2016 | Wang | |
| 2016/0318177 A1 | 11/2016 | Bostick et al. | |
| 2016/0339789 A1 | 11/2016 | Wang et al. | |
| 2016/0375779 A1 | 12/2016 | Wang | |
| 2017/0129464 A1 | 5/2017 | Wang et al. | |
| 2017/0129603 A1 | 5/2017 | Raptopoulos et al. | |
| 2017/0190260 A1 | 7/2017 | Wang et al. | |
| 2018/0194466 A1 | 7/2018 | Zhao et al. | |
| 2018/0312069 A1 | 11/2018 | McClymond | |
| 2019/0039752 A1 | 2/2019 | Venturelli et al. | |

FOREIGN PATENT DOCUMENTS

| | | |
|---|---|---|
| CN | 102044889 A | 5/2011 |
| CN | 102064578 A | 5/2011 |
| CN | 202089043 U | 12/2011 |
| CN | 202190096 U | 4/2012 |
| CN | 202271897 U | 6/2012 |
| CN | 102730189 A | 10/2012 |
| CN | 102738890 A | 10/2012 |
| CN | 202642094 U | 1/2013 |
| CN | 202651882 U | 1/2013 |
| CN | 102909540 A | 2/2013 |
| CN | 202922160 U | 5/2013 |
| CN | 202929383 U | 5/2013 |
| CN | 103219763 A | 7/2013 |
| CN | 103359283 A | 10/2013 |
| CN | 103593265 A | 2/2014 |
| CN | 203434741 U | 2/2014 |
| CN | 203491696 U | 3/2014 |
| CN | 103738503 A | 4/2014 |
| CN | 203698671 U | 7/2014 |
| CN | 203845022 U | 9/2014 |
| DE | 102007003458 A1 | 7/2008 |
| EP | 2644438 A2 | 10/2013 |
| EP | 2664539 A1 | 11/2013 |
| EP | 2799336 A1 | 11/2014 |
| FR | 2518733 A1 | 6/1983 |
| JP | H0382346 A | 4/1991 |
| JP | H03147116 A | 6/1991 |
| JP | H05184008 A | 7/1993 |
| JP | H05189095 A | 7/1993 |
| JP | H0594236 U | 12/1993 |
| JP | H0627369 U | 4/1994 |
| JP | H0727512 A | 1/1995 |
| JP | H07200108 A | 8/1995 |
| JP | H09315139 A | 12/1997 |
| JP | 3044978 B2 | 5/2000 |
| JP | 3182689 B2 | 7/2001 |
| JP | 2006014524 A | 1/2006 |
| JP | 2006193027 A | 7/2006 |
| JP | 2012056462 A | 3/2012 |
| JP | 2012232654 A | 11/2012 |
| JP | 2013025753 A | 2/2013 |
| JP | 2013531573 A | 8/2013 |
| JP | 2013203394 A | 10/2013 |
| JP | 2013241177 A | 12/2013 |
| JP | 2014031118 A | 2/2014 |
| JP | 2014104797 A | 6/2014 |
| KR | 20130122715 A | 11/2013 |
| RU | 2164881 C1 | 4/2001 |
| WO | WO-2012064891 A2 | 5/2012 |
| WO | WO-2013055265 A1 | 4/2013 |
| WO | 2013079583 A1 | 6/2013 |
| WO | 2014020644 A1 | 2/2014 |
| WO | 2014068982 A1 | 5/2014 |
| WO | 2016019564 A1 | 2/2016 |

OTHER PUBLICATIONS

Co-pending U.S. Appl. No. 15/230,294, filed Aug. 5, 2016.
Co-pending U.S. Appl. No. 15/261,716, filed Sep. 9, 2016.
International search report and written opinion dated Mar. 12, 2015 for PCT/CN2014/091939.

(56) References Cited

OTHER PUBLICATIONS

International search report and written opinion dated Apr. 27, 2015 for PCT/CN2014/083968.
International search report and written opinion dated May 4, 2015 for PCT/CN2014/083957.
International search report and written opinion dated Dec. 31, 2014 for PCT/CN2014/083963.
Notice of allowance dated Apr. 15, 2016 for U.S. Appl. No. 14/832,808.
Notice of allowance dated May 5, 2016 for U.S. Appl. No. 14/800,487.
Notice of allowance dated May 20, 2015 for U.S. Appl. No. 14/495,696.
Notice of allowance dated Jul. 17, 2015 for U.S. Appl. No. 14/495,696.
Notice of allowance dated Jul. 19, 2016 for U.S. Appl. No. 15/056,957.
Notice of allowance dated Jul. 29, 2015 for U.S. Appl. No. 14/495,696.
Notice of allowance dated Sep. 23, 2016 for U.S. Appl. No. 15/048,948.
Notice of allowance dated Nov. 10, 2015 for U.S. Appl. No. 14/634,489.
Office action dated Feb. 13, 2015 for U.S. Appl. No. 14/495,696.
Office action dated May 20, 2016 for U.S. Appl. No. 15/048,948.
Office action dated Aug. 4, 2015 for U.S. Appl. No. 14/634,489.
Office action dated Dec. 2, 2015 for U.S. Appl. No. 14/832,808.
Office action dated Dec. 31, 2015 for U.S. Appl. No. 14/800,487.
Koji A. O. Suzuki, et al., Automatic Battery Replacement System for UAVs: Analysis and Design, Journal of Intelligent and Robotic Systems, Sep. 9, 2011, pp. 563-586, vol. 65, No. 1-4.
Daniel R. Dale, Automated Ground Maintenance and Health Management for Autonomous Unmanned Aerial Vehicles, Electrical Engineering and Computer Sciences—Master's degree, Jan. 2006, pp. 87-92, Massachusetts Institute of Technology. Retrieved from the Internet: https://dspace.mit.edu/bitstream/handle/1721.1/41541/219716342-MIT.pdf?sequence=2&isAllowed=y.

* cited by examiner

MULTI-ZONE BATTERY EXCHANGE SYSTEM

CROSS REFERENCE

This application is a continuation application of U.S. application Ser. No. 15/048,948, filed on Feb. 19, 2016, which is a continuation application of U.S. application Ser. No. 14/634,489, filed on Feb. 27, 2015, now U.S. Pat. No. 9,284,062, which is a continuation application of International Application No. PCT/CN2014/083963, filed on Aug. 8, 2014, the content of which are hereby incorporated by reference in their entirety.

BACKGROUND OF THE INVENTION

Aerial vehicles such as unmanned aerial vehicles (UAVs) can be used for performing surveillance, reconnaissance, and exploration tasks for military and civilian applications. Such aerial vehicles may carry a payload configured to perform a specific function.

In some instances, it may be desirable for aerial vehicles to travel extended distances. However, the distance that an aerial vehicle may be able to travel may be limited by the life of a battery carried by the aerial vehicle.

SUMMARY OF THE INVENTION

In some instances, it may be desirable for an aerial vehicle, such as an unmanned aerial vehicle (UAV) to travel for extended distances. Thus, a need exists for improved UAV powering systems that may permit a UAV to reload battery life, thereby permitting the UAV to travel the extended distances. The present invention provides systems, methods, and devices related to permitting battery life to be re-loaded on a UAV through recharging a battery on the UAV, or exchanging the battery for another battery. A ground station may be provided which may reload battery life for multiple UAVs. The ground station may include multiple zones which may permit multiple UAVs to interact with the ground station simultaneously. In some instances, the ground station may accommodate different types of UAVs or batteries, or different techniques or energy provision rules for reloading energy on a UAV. Communication between the UAV and the battery station may be implemented to ensure robust communications between the battery station and the flying UAV.

An aspect of the invention is directed to a UAV energy provision station, said station comprising: a first UAV landing area configured to (1) support a UAV of a first type when the UAV is resting on the station, said UAV coupled to a first battery configured to power the UAV, and (2) charge the first battery or exchange the first battery for another battery while the UAV is supported by the first UAV landing area; and a second UAV landing area configured to (1) support a UAV of a second type different from the first type when the UAV is resting on the station, said UAV coupled to a second battery configured to power the UAV, and (2) charge the second battery or exchange the second battery for another battery while the UAV is supported by the second UAV landing area, wherein the first UAV landing area is not configured to charge the second battery or exchange the second battery for another battery for a UAV of the second type.

In some embodiments, the second UAV landing area is not configured to charge the first battery or exchange the first battery for another battery for a UAV of the first type. The UAV of the first type and the UAV of the second type may have different dimensions or shapes. The first battery and the second battery may be of different types. The form factors of the first battery and the second battery may be different. The battery chemistry of the first battery and the second battery may be different.

The UAV of the first type may include a recessed region into which the first battery is inserted to couple to the UAV and provide power to the UAV. The other battery may be configured to be inserted into the recessed region to couple to the UAV of the first type and provide power to the UAV of the first type. A battery charging unit may be configured to charge the first battery while the first battery is inserted in the recessed region.

The first UAV landing area and the second UAV landing area may include visible markers configured to aid the UAV in landing. The visible markers may include images. The visible markers may include LED lights. The visible markers may dynamically change over time.

Optionally, the energy provision station may be portable.

An additional aspect of the invention may be directed to a UAV energy provision station, said station comprising: a first UAV landing area configured to (1) support a first UAV when the first UAV is resting on the station, said first UAV coupled to a first battery configured to power the first UAV, and (2) charge the first battery or exchange the first battery for another battery in accordance with a first set of energy provision rules while the first UAV is supported by the first UAV landing area; and a second UAV landing area configured to (1) support a second UAV when the second UAV is resting on the station, said second UAV coupled to a second battery configured to power the second UAV, and (2) charge the second battery or exchange the second battery for another battery in accordance with a second set of energy provision rules while the second UAV is supported by the second UAV landing area, wherein the first set of energy provision rules and the second set of energy provision rules are different from one another.

In some embodiments, the first set of energy provision rules only permits charging the first battery without permitting exchanging the first battery for another battery. Optionally, the second set of energy provision rules only permits exchanging the second battery for another battery without permitting charging of the second battery.

The first set of energy provision rules may provide faster completion of the charge of the first battery or faster exchange of the first battery for another battery relative to those of the second set of energy provision rules.

The first set of energy provision rules may provide charging the first battery to a first state of charge or exchanging the first battery for another battery of the first state of charge, and the second set of energy provision rules may provide charging the second battery to a second state of charge or exchanging the second battery for another battery of the second state of charge, wherein the second state of charge is different from the first state of charge.

The first set of energy provision rules may depend on a state of charge of the first battery. The second set of energy provision rules may depend on a state of charge of the second battery.

The first UAV may be of a first type and the second UAV may be of a second type have different dimensions or shapes.

The first battery and the second battery may be of different types. Form factors of the first battery and the second battery may be different. Battery chemistry of the first battery and the second battery can be different.

The energy provision station may further comprise a first GPS sensor, wherein the first UAV or the second UAV has a second GPS sensor, wherein the first GPS sensor and the second GPS sensor operate in concert to provide navigation to the first UAV or the second UAV in relation to the energy provision station.

The first UAV landing area and the second UAV landing area may include visible markers configured to aid the UAV in landing. The visible markers may include images. The visible markers may include LED lights. The visible markers may dynamically change over time.

The energy provision station may further comprise a visible marker displayed on the station. The first UAV or the second UAV may comprise (a) a sensor configured to capture an image of the visible marker, and (b) a processor to determine whether to land at the first UAV landing area or the second UAV landing area in response to the visible marker. The first UAV may be assigned a first visible marker and the second UAV may be assigned a second visible marker, and the processor may be configured to detect whether the visible marker has a visual pattern matching the first visible marker or the second visible marker. The visible marker may direct the first UAV or the second UAV to land at an unoccupied UAV landing area. The first UAV or the second UAV may comprise a sensor configured to detect whether a UAV landing area on the energy provision station is unoccupied.

The energy provision station may receive energy from a power source that is an unreliable grid, or from off the grid. The energy from the power source may be used to charge the first battery or the second battery.

In some instances, the energy provision station may be portable.

A UAV energy provision station may be provided in accordance with an additional aspect of the invention. The energy provision station may comprise: a first UAV landing area comprising a first visible marker configured to (1) support a first UAV when the first UAV is resting on the station, said first UAV coupled to a first battery configured to power the first UAV, and (2) charge the first battery or exchange the first battery for another battery while the first UAV is supported by the first UAV landing area; and a second UAV landing area comprising a second visible marker configured to (1) support a second UAV when the second UAV is resting on the station, said second UAV coupled to a second battery configured to power the second UAV, and (2) charge the second battery or exchange the second battery for another battery while the second UAV is supported by the second UAV landing area, wherein the first visible marker is visually distinguishable from the second visible marker.

The first visible marker may be an image and the second visible marker may be a different image than the first visible marker. The first visible marker may be a bar code or QR code and the second visible marker may be a bar code or QR code of a different pattern than the first visible marker. The first visible marker may include a pattern of lights and the second visible marker may include a different pattern of lights from the first visible marker.

In some implementations, the first visible marker and the second visible marker may dynamically change over time.

The first UAV may be configured to land when the first visible marker becomes apparent and the second UAV may be configured to land when the second visible marker becomes apparent. The first visible marker may remain visible while the first UAV is at the first UAV landing area, and wherein the second visible marker may remain visible while the second UAV is at the second UAV landing area.

The first visible marker may be indicative of the first landing area for the first UAV of a first type, and the second visible marker may be indicative of the second landing area for the second UAV of a second type that is different from the first type. The first visible marker may be indicative of the first landing area using a first set of energy provision rules, and (2) the second visible marker may be indicative of the second landing area using a second set of energy provision rules different from the first set of energy provision rules.

The first UAV and the second UAV may be of the same type. Alternatively, the first UAV and the second UAV may be of different types.

The first UAV landing area and the second UAV landing area may have a lower surface upon which the UAV may rest. The first UAV landing area and the second UAV landing area can be landing bays having a ceiling that is configured to partially or completely overlie a UAV. The landing bays may have an open side configured to permit passage of a UAV. The open side may remain open while a UAV is within a landing bay. The open side may comprise a door that is closed when the UAV is within the landing bay. The door may be opened when the UAV is entering or exiting the landing bay.

A method for directing a UAV to a landing area of a UAV energy provision station, said method comprising: providing a first UAV landing area configured to (1) support a UAV when the UAV is resting on the station, said UAV coupled to a battery configured to power the UAV, and (2) charge the battery or exchange the first battery for another battery while the UAV is supported by the first UAV landing area; providing a second UAV landing area configured to (1) support a UAV when the UAV is resting on the station, said UAV coupled to a battery configured to power the UAV, and (2) charge the second battery or exchange the battery for another battery while the UAV is supported by the second UAV landing area; and receiving, at a processor, a signal indicative of information about a UAV having a battery on board, that is to land at the UAV energy provision station, and generating a command for the UAV to land at the first UAV landing area or the second landing area based on the information about the UAV.

The information about the UAV may include information about a type of the UAV. The first UAV landing area may be configured to support a UAV of a first type and a second UAV landing area may be configured to support a UAV of a second type that is different from the first type. The command may be for the UAV to land at the first UAV landing area when the UAV is of the first type, or for the UAV to land at the second UAV landing area when the UAV is of the second type.

The information about the UAV may include information about a state of charge of a battery on board the UAV. The information about the UAV may include information about a timeframe in which the battery on board the UAV needs to be charged or exchanged for another battery. The information about the UAV may include an estimate for the state of charge on the battery board on board the UAV needs to be to meet an anticipated travel plan for the UAV. The method may further comprise determining, using one or more processors on board the UAV, whether additional battery life is needed for the battery on board the UAV to meet the anticipated travel plan. The method may further comprise causing the UAV to land at the UAV energy provision station when the additional battery life is needed. The information about the UAV may comprise information about whether the battery on board the UAV needs to be charged and not exchanged for another battery or vice versa. Optionally, the first UAV landing area may only permit charging the first battery without permitting exchanging the first battery for another battery. The command may be for the UAV to land at the first UAV landing area when the battery on board the UAV needs to be charged. In some instances, the second UAV landing area only permits exchanging the battery for another battery without permitting charging of the battery. The command may be for the UAV to land at the second UAV landing area when the battery on board the UAV needs to be exchanged for another battery.

The method may further comprise receiving, at a processor, a signal indicative of information about one or more batteries stored at the UAV energy provision station.

Furthermore, aspects of the invention may be directed to a UAV energy provision station, said station comprising: a UAV landing area comprising a visible marker, said UAV landing area configured to (1) support a UAV when the UAV is resting on the station, said UAV coupled to a first battery configured to power the UAV, and (2) charge the first battery or exchange the first battery for another battery while the UAV is supported by the UAV landing area, wherein the visible marker is configured to dynamically change from a first visible marker configuration to a second visible marker configuration, wherein the first visible marker configuration is visually distinguishable from the second visible marker configuration.

The visible marker may be an image, and the first visible marker configuration may be a first image and the second visible marker configuration may be a second image that is different from the first image. The first image may be a bar code or QR code and the second image is a bar code or QR code of a different pattern than the first image. The visible marker may include a pattern of light, and the first visible marker configuration may include a first pattern of lights and the second visible marker configuration may include a second pattern of lights that is different from the first pattern of lights. The pattern of lights may include a change of the lights within a predetermined period. The pattern of lights may include a blinking pattern. The pattern of lights may include a spatial arrangement of the lights.

The first visible marker configuration may be indicative that the landing area is prepared to receive a first UAV of a first type, and the second visible marker configuration may be indicative that the landing area is prepared to receive a second UAV of a second type that is different from the first type. The first visible marker configuration may be indicative that the landing area is prepared to operate using a first set of energy provision rules, and the second visible marker configuration may be indicative that the landing area is prepared to operate using a second set of energy provision rules different from the first set of energy provision rules.

The energy provision station may further comprise an additional UAV landing area comprising an additional visible marker, said additional UAV landing area configured to (1) support a UAV when the UAV is resting on the station, said UAV coupled to a second battery configured to power the UAV, and (2) charge the second battery or exchange the second battery for another battery while the UAV is supported by the UAV landing area.

The energy provision station may further comprise one or more processors configure to, collectively or individually, receive signals indicative of a presence of a plurality of UAVs to land at the energy provision station. The one or more processors may receive information about a priority level of missions to be performed from the plurality of UAVs. A first UAVs with a higher priority mission may be directed to land at the UAV landing area with aid of the visible marker and a second UAV with a lower priority mission may be directed to land at an additional UAV landing area of the energy provision station with aid of the visible marker. A first UAVs with a higher priority mission may be directed to land at the UAV landing area prior to a second UAV with a lower priority mission with aid of the visible marker. A first UAVs requiring a faster energy reload may be directed to land at the UAV landing area with aid of the visible marker and a second UAV not requiring the faster energy reload may be directed to land at an additional UAV landing area of the energy provision station with aid of the visible marker. A first UAVs requiring a faster energy reload may be directed to land at the UAV landing area prior to a second UAV not requiring the faster energy reload with aid of the visible marker. A first UAVs requiring an energy reload by charging a battery onboard the first UAV may be directed to land at the UAV landing area with aid of the visible marker and a second UAV requiring an energy reload by exchanging a battery on board the second UAV for another battery may be directed to land at an additional UAV landing area of the energy provision station with aid of the visible marker.

Additional aspects of the invention may include a method for directing a UAV to a landing area of a UAV energy provision station, said method comprising: providing the UAV energy provision station as previously described; causing a first UAV to land on the UAV landing area when the visible marker has a first visible marker configuration; and causing a second UAV to land on the UAV landing area when the visible marker has a second visible marker configuration.

Causing the first UAV to land may include storing, in a memory of the first UAV, the first visible marker configuration; and detecting, using a sensor of the first UAV, the first visible marker configuration of the visible marker. Causing the second UAV to land may include storing, in a memory of the second UAV, the second visible marker configuration; and detecting, using a sensor of the second UAV, the second visible marker configuration of the visible marker.

The first UAV and the second UAV may be of the same type. The first UAV and the second UAV may be of different types. The method may further comprise sending a signal from the first UAV to the energy provision station indicative of a power status of the first UAV. The visible marker may have the first visible marker configuration in response to the signal from the first UAV. The method may further comprise sending a signal from the second UAV to the energy provision station indicative of a power status of the second UAV. The visible marker may be changed to a second visible marker configuration in response to the signal from the second UAV.

Further aspects of the invention may be directed to a method for directing a UAV to a landing area of a UAV energy provision station, said method comprising: determining, with aid of one or more processors, whether the UAV is to (1) land at the UAV energy provision station, or (2) continue on to another location without landing at the UAV energy provision station; determining a position in a UAV queue for the UAV to land at the energy provision station; selecting a UAV landing area from a plurality of UAV landing areas for the UAV to land, wherein the selected UAV landing area is configured to reload energy on the UAV; and directing the UAV to the selected UAV landing area when the selected UAV landing area is prepared to accept the UAV.

In some embodiments, the one or more processors are on board the UAV. Alternatively, the one or more processors are on board the energy provision station. The position in the UAV queue may be determined with aid of one or more processors on board the energy provision station The method may further comprise exchanging data between the UAV and the energy provision station prior to determining whether the UAV is to (1) land, or (2) continue. The data exchanged may comprise one or more of the following: state of a battery on board the UAV, flight conditions, time or distance remaining on a mission for the UAV, distance to another energy provision station, UAV specifications, state of the UAV, or information pertaining to a payload on board the UAV. The position in the UAV queue may be determined based on the data exchanged between the UAV and the energy provision station. The position in the UAV queue may be determined based on a priority of a mission of the UAV in relation to a priority of a mission of another UAV in the queue. The queue may comprise a plurality of UAVs.

The selected UAV landing area may be configured to reload energy on the UAV by (1) recharging a battery on board the UAV, or (2) exchanging the battery on board the UAV with another battery from the energy provision station. The energy provision station may comprise a battery storage unit configured to store and charge the other battery.

Directing the UAV to the selected UAV landing area may comprise displaying a visible marker detectable by the UAV indicative of the selected UAV landing area. The visible marker may be displayed when the selected UAV landing area is prepared to accept the UAV and is not displayed before the selected UAV landing area is prepared to accept the UAV. The method may further comprise maintaining the configuration of the selected UAV landing area for arrival of the UAV. The method may further comprise altering the configuration of the selected UAV landing area for arrival of the UAV. The method may further comprise updating the queue when the UAV is directed to the selected UAV landing area.

The UAV may fly to the selected UAV landing area. The UAV may be conveyed, with aid of a queuing region, to the selected UAV landing area. The queuing region may be a conveyor belt configured to transport the UAV to the selected UAV landing area.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
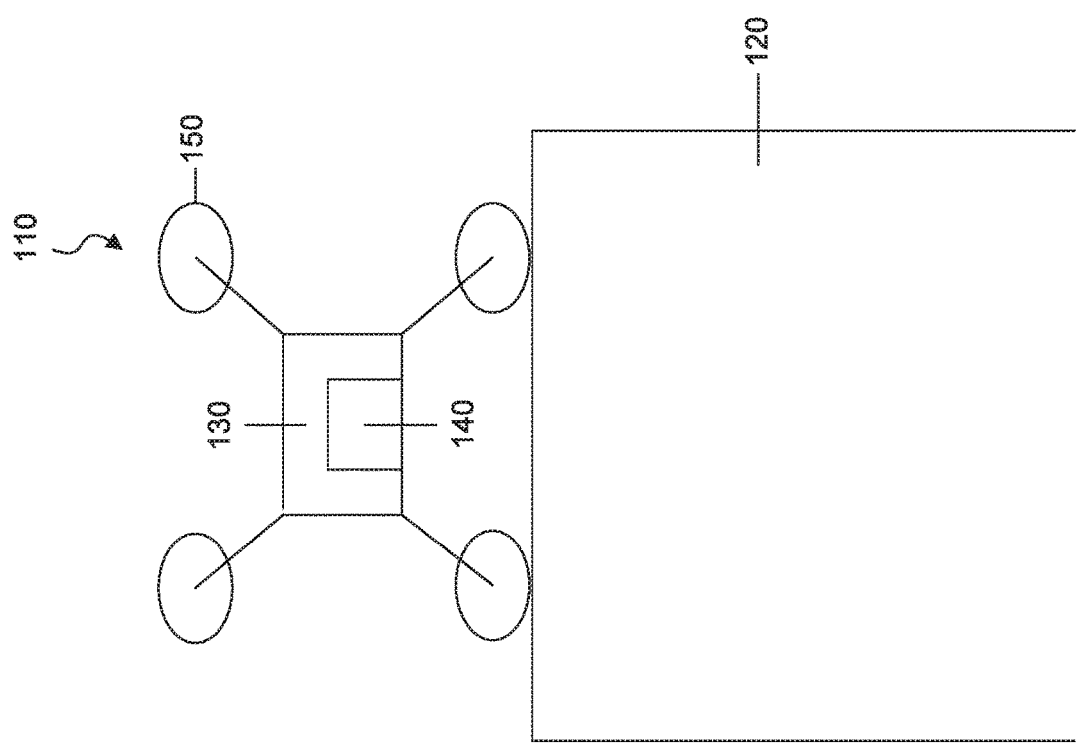
FIG. 1 shows an example of an unmanned aerial vehicle (UAV) that has landed on a battery station in accordance with an embodiment of the invention.

The systems, devices, and methods of the present invention provide interaction between an unmanned aerial vehicle (UAV) and a battery station. Description of the UAV may be applied to any other type of unmanned vehicle, or any other type of movable object. Description of the vehicle may apply to land-bound, underground, underwater, water surface, aerial, or space-based vehicles. The interaction between the UAV and the battery station may include reloading battery life on the UAV using the battery station. The battery station may have multiple zones which may permit multiple UAVs to interact with the battery station simultaneously. Communications may occur between the UAV and the battery station while the UAV is separated from the battery station and/or while the UAV has landed on the battery station.

A UAV may be powered by a battery on-board the UAV. The energy level of the battery may be depleted as the UAV is in operation. This may limit the amount of time that a UAV is in flight, which may also limit the range of the UAV. It may be desirable for a UAV to fly for an extended period of time and/or for an extended distance. For example, the UAV may be delivering an item from one location to another location. The UAV may need to travel extended distances to deliver the item. In another example, the UAV may need to survey an area or capture data relating to a long distance, or over a long period of time. Such periods of times and/or distance may exceed a battery life of the UAV.

Thus, a need may exist for the UAV to be able to reload battery life. It may be desirable for the reloading to occur in an automated or semi-automated fashion without requiring human intervention. For instance, a UAV may be able to automatically land at an energy provision station, which may reload battery life on the UAV. The energy provision station may automatically recharge the battery of the UAV or may exchange the battery for a new battery. The presence of energy provision stations may cut costs and time for the UAV battery life to be reloaded, and for the UAV to continue on in its mission. Not requiring human presence or intervention may cut costs, and may permit battery reloading to occur in remote locations. The energy provision station may also be capable of reloading battery life fairly rapidly, which may reduce delays in the UAV carrying out its mission.

The energy provision station may have a plurality of landing zones. The plurality of landing zones may permit multiple UAVs to interact with the energy provision station simultaneously. This may be useful in heavily trafficked regions, or when UAVs need to be serviced quickly. The plurality of landing zones may optionally be configured to accommodate different types of UAVs and/or batteries. The different zones may optionally operate in accordance with different energy provision rules, which may relate to battery reloading technique (e.g., charging versus exchanging batteries), speed of energy provision, or level of energy provision. In some instances, markers may be used to aid in guiding the UAVs to the desired landing zone at the desired time.

FIG. 1 shows an example of an unmanned aerial vehicle (UAV) that has landed on a battery station in accordance with an embodiment of the invention. A UAV 110 may be capable of landing on and/or taking off from an energy provision station 120. The energy provision station 120 may be a battery station. The energy provision station may be a ground station.

The UAV 110 may include a body 130, a battery 140, and one or more propulsion units 150. Any description herein of a UAV 110 may apply to any type of movable object. The description of a UAV may apply to any type of unmanned movable object (e.g., which may traverse the air, land, water, or space). The UAV 110 may be capable of responding to commands from a remote controller. The remote controller may be not connected to the UAV. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously.

The body 130 may be a central body which may have one or more branching members, or "arms." The arms may extend outward from the body 130. The arms may extend outward in a radial manner and be joined via the body 130. The number of arms may match the number of propulsion units, or rotors, of the UAV 110. The body 130 may comprise a housing. The housing may enclose one or more components of the UAV 110 within the housing. In some instances, one or more electrical components of the UAV may be provided within the housing. For example, a flight controller of the UAV may be provided within the housing. The flight controller may control operation of one or more propulsion units 150 of the UAV.

The UAV may include a battery 140. Any description herein of a battery of the UAV may apply one or more batteries on-board the UAV 110. In some instances, one, two, three, four, five, six, seven, eight, or more batteries may be provided on board the UAV 110. Any description herein of a battery may apply to a battery pack that may include one or more batteries connected in series, in parallel, or any combination thereof. Any description herein of a battery of the UAV may apply to any energy storage device on the UAV 110. The battery 140 may be an electrochemical battery. Batteries 140 having any battery chemistry known or later developed in the art may be used. In some instances, batteries 140 may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The battery cells may be connected in series, in parallel, or any combination thereof. The battery cells may be packaged together as a single unit or multiple units. The batteries may be rechargeable batteries.

The battery 140 may have any length of life. The length of life a battery may include the amount of time from the current battery state of charge to a completely depleted state of charge. In some instances, a battery life may be less than or equal to about 1 minute, 5 minutes, 10 minutes, 15 minutes, 20 minutes, 25 minutes, 30 minutes, 35 minutes, 40 minutes, 45 minutes, 50 minutes, 1 hour, 1.5 hours, 2 hours, 3 hours, 4 hours, 5 hours, 6 hours, 8 hours, 10 hours, 12 hours, 18 hours, or 24 hours from a fully charged state to a fully depleted state. Optionally, the battery life may be greater than or equal to any of the values described herein from a fully charged to fully depleted state. In some embodiments, the battery life may fall into a range between any two of the values described herein. The length of the battery life may be the amount of time to depletion of the battery while the UAV 110 is in operation. This may include while the UAV 110 is in flight. This may include while one or more sensors of the UAV 110 is operating, which may include one or more navigational sensors or image capturing devices. This may include while the battery is powering one or more component of the UAV 110, such as those mentioned elsewhere herein.

A battery 140 may be coupled to a UAV 110. The battery 140 may be coupled to a UAV 110 to provide power to one or more components of the UAV 110. The battery 140 provide power to one or more propulsion units, flight controller, sensor, inertial measurement unit, communication unit, and/or any other component of the UAV 110 while coupled to the UAV 110. An electrical communication may be formed between the battery 140 and one or more components of the UAV 110 when the battery is coupled to the UAV 110. When a battery 140 is decoupled from the UAV 110, the battery 140 may not provide power to the UAV 110. The battery 140 may not provide power to any components of the UAV 110 when decoupled from the UAV 110. For instance, the battery 140 may not provide power to one or more propulsion units, flight controller, sensor, inertial measurement unit, communication unit, and/or any other component of the UAV while decoupled from the UAV. Examples of sensors of the UAV may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), or field sensors (e.g., magnetometers, electromagnetic sensors).

The battery 140 may optionally be within a body 130 of the UAV 110 while coupled to the UAV 110. In some instances, the UAV 110 may include a recessed region into which the battery may be inserted. In some instances, the battery 140 may within a housing of the UAV 110 while coupled to the UAV 110. In some instances, the housing may include a door, or similar opening through which the battery may be inserted to be coupled to the UAV and/or removed to be decoupled to the UAV 110. The battery 140 may be in contact with an electrical contact of the UAV 110 when the battery 140 is coupled to the UAV 110. The battery 140 may be electrically connected to one or more components of the UAV 110 via the electrical contact. The electrical contact may be provided within a recessed region of the UAV 110. The battery 140 may be coupled to the UAV 110 when the battery 140 is inserted into the recessed region to come into contact with the electrical contact. The battery 140 may be decoupled from the UAV when the battery 140 is removed from the recessed region and/or no longer in contact with the electrical contact.

The UAV 110 may be an aerial vehicle. The UAV 110 may have one or more propulsion units 150 that may permit the UAV 110 to move about in the air. The one or more propulsion units 150 may enable the UAV 110 to move about one or more, two or more, three or more, four or more, five or more, six or more degrees of freedom. In some instances, the UAV 110 may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV 110 may be able to move along one or more dimensions. For example, the UAV 110 may be able to move upwards due to the lift generated by one or more rotors. In some instances, the UAV 110 may be capable of moving along a Z axis (which may be up relative to the UAV orientation), an X axis, and/or a Y axis (which may be lateral). The UAV 110 may be capable of moving along one, two, or three axes that may be orthogonal to one another.

The UAV 110 may be a rotorcraft. In some instances, the UAV 110 may be a multi-rotor craft that may include a plurality of rotors. The plurality or rotors may be capable of rotating to generate lift for the UAV 110. The rotors may be propulsion units that may enable the UAV 110 to move about freely through the air. The rotors may rotate at the same rate and/or may generate the same amount of lift or thrust. The rotors may optionally rotate at varying rates, which may generate different amounts of lift or thrust and/or permit the UAV 110 to rotate. In some instances, one, two, three, four, five, six, seven, eight, nine, ten, or more rotors may be provided on a UAV 110. The rotors may be arranged so that their axes of rotation are parallel to one another. In some instances, the rotors may have axes of rotation that are at any angle relative to one another, which may affect the motion of the UAV.

The UAV 110 may be of small dimensions. The UAV 110 may be capable of being lifted and/or carried by a human. The UAV may be capable of being carried by a human in one hand. The UAV 110 may be capable of fitting on top of a ground station 120 or a landing zone of a ground station.

The UAV 110 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 110 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 h, 80 h, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV 110 may be capable of interacting with a battery station 120. The battery station 120 may be a ground station that may rest on a surface. The battery station 120 may rest on solid ground, water, any natural terrain, any man-made structure or platform, or be carried by any type of vehicle (e.g., land-based vehicle, water-based vehicle, aerial vehicle, or space vehicle).

The battery station 120 may be configured to reload battery life on a battery 140 of the UAV 110. This may include recharging the battery 140 of the UAV 110. Reloading battery life may also include exchanging the battery on-board the UAV 110 for another battery. The battery station 120 may store one or more batteries that may be exchanged with the battery that is initially on-board the UAV 110. The new battery may have a higher state of charge that the initial battery. The new battery may optionally be fully charged. In some instances, the initial battery from the UAV 110 may be decoupled from the UAV 110 and taken by the battery station 120. The battery station 120 may charge the initial battery 140 from the UAV 110.

The battery station 120 may include a landing area on which the UAV 110 may rest. The landing area may be a zone of the battery station on which the UAV may land. While the UAV has landed, the battery life of the UAV may be reloaded. While the UAV is resting on the landing area, the UAV battery may be exchanged for another battery, or may be recharged.

Figure 2:
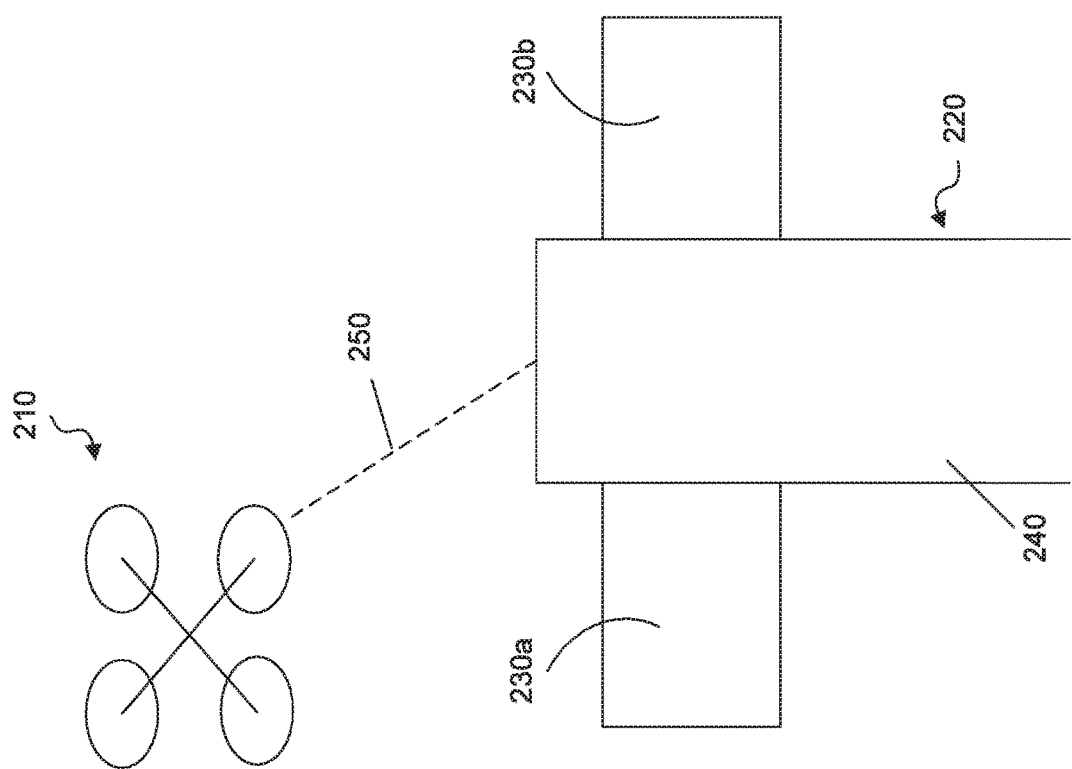
FIG. 2 shows an example of a UAV in communication with a multi-zone battery station while the UAV is in flight in accordance with an embodiment of the invention.

FIG. 2 shows an example of a UAV 210 in communication with a multi-zone battery station 220 while the UAV 210 is in flight in accordance with an embodiment of the invention. A UAV 210 may approach a multi-zone battery station 220. The multi-zone battery station 220 may include one or more zones 230a, 230b which may be configured to support a UAV 210. The zones 230a, 230b may or may not share a common support or base structure 240. A communication link 250 may be established between the UAV 210 and the battery station 220.

In some instances, it may be desirable to reload battery life for a UAV 210. For example, the UAV 210 may be running low on battery charge. The state of charge of a battery of the UAV 210 may fall beneath a predetermined threshold. The UAV 210 may need to extend its battery life in order to travel a pre-planned route, or an anticipated distance or length of time. The UAV 210 may anticipate how much battery life is needed for pre-planned travel and reload the battery life if the current battery life is not sufficient. The UAV 210 may reload battery life in response to instructions from a remote user, or may autonomously determine that additional battery life is needed. The UAV 210 may detect the presence of a battery station and may fly to the battery station if needed.

A battery station 220 may have multiple zones 230a, 230b. The multiple zones 230a, 230b may be multiple landing areas upon which a UAV 210 may land. A landing area may include a surface which may support a weight of a UAV 210. Any number of zones may be provided for a battery station. A battery station may have one or more, two or more, three or more, four or more, five or more, six or more, seven or more, eight or more, ten or more, fifteen or more, or twenty of more zones. The zones may or may not share a common support structure or base 240. The zones may or may not be physically connected to one another. The zones may be provided at different lateral areas and/or heights. The zones may have the same substantial configuration, or may have different configurations.

In some embodiments, the various zones 230a, 230b may each be capable of reloading battery life on a UAV 210. In some instances, a plurality of different zones may be capable of each reloading battery life via recharging a battery on a UAV 210 and/or exchanging the battery for another battery. Alternatively, in some embodiments, a first zone in a plurality of zones may be configured to recharge a battery on a UAV 210 without being configured to exchange the battery, and a second zone in a plurality of zones may be configured to exchanging the battery for another battery without being configured to recharge a battery on the UAV 210. Optionally, a third zone may be provided that may capable of recharging the battery on the UAV 210 and being capable of exchanging the battery for another battery. In some embodiments, each zone may be capable of performing any battery life reloading technique, while in other embodiments, different zones may be dedicated to different techniques for reloading battery life.

Optionally, the various zones 230a, 230b may operate in accordance with a set of energy provision rules. The energy provision rules may include battery life reload techniques, such as recharging a battery vs. exchanging a battery. Battery life reload techniques may also include reloading energy while the battery is on-board the UAV, or removing the battery from the UAV to provide energy to the UAV. The energy provision rules may include battery life reload techniques that may comply with different goals. For example, the energy provision rule may include a goal of reloading battery life as quickly as possible. This may include reloading battery life to a full state of charge as quickly as possible, or to a predetermined threshold state of charge as quickly as possible. In another example, the energy provision rule may include a goal of reloading battery life in a manner that will keep the battery quality of deteriorating as much as possible (extending the physical life of the battery as much as possible). Another example may include reloading battery life in an energy efficient manner. An additional example, may include a goal of reloading battery life in a cost efficient manner. For example, if the battery station gets energy to charge a battery from a utility grid, it may consider peak and off peak times in determining the energy provision rule to follow. Similarly, the battery station 220 may get energy from an unreliable grid, or from off the grid. In some instances, some UAVs may be of higher priority than other UAVs for recharging battery life. Such considerations may be taken into effect in determining the energy provision rule to follow.

Single goals may be provided, and used to determine the applicable energy provision rules and zone selection and landing schedule for a UAV. In some instances, multiple goals may be provided, and the various zones may operate to optimize the multiple goals. In some instances, a primary goal may be provided, which may supersede one or more of the other goals. The primary goal may be optimized while threshold for one or more of the other goals are met. A battery station may include a controller that may determine landing zone selection and/or timing for one or more UAVs at the multiple zones. The controller may take into account multiple goals for multiple UAVs in determining the landing zone selection and/or timing. The energy provision rules may be selected and/or considered in determining the landing zone selection and/or timing across multiple zones.

The various energy provision rules may include recharging vs. exchanging batteries. The various energy provision rules may also take into account the speed of charging, the schedule of charging, the level to which to recharge, or any other factors relating to recharging a battery. The various energy provision rules may also take into account the rapidity or timing of exchanging a battery, what level of charge the updated battery should have, the type of battery with which to replace the initial battery, or any other factors relating to recharging a battery.

Different zones may follow different energy provision rules. Alternatively, different zones may follow the same energy provision rules. In some embodiments, one or more of the zones may be capable of complying with multiple energy provision rules. In other instances, one or more zones may be capable of complying with only one, or a limited subset of energy provision rules. Thus, different zones may be dedicated to following different energy provision rules. For example, a first UAV landing area may be provided that may reload battery life on a UAV in accordance with a first set of energy provision rules, and a second UAV landing area may be provided that may reload battery life in accordance with a second set of energy provision rules, where the second set of energy provision rules may differ from the first set of energy provision rules.

In another example, different zones 230a, 230b may be configured to accept different types of UAVs. For example, a first UAV landing area may be configured to support a UAV a first UAV type while a second UAV landing area may be configured to support a UAV of a second UAV type that may differ from the first UAV type. The first landing area may optionally be configured to not support a UAV of the second type. Similarly, the second landing area may optionally be configured to not support a UAV of the first type.

Different types of UAVs may have different features that may require different dedicated landing zones and/or areas. In some examples, the different types of UAVs may be of different sizes and/or shapes. The different UAVs may be of different weights. A landing area may be specifically designed to support a UAV having a particular size, form factors, and/or weight. In some instances, a landing area may be specifically configured to accept a UAV having a particular landing stand configuration. A landing stand of a UAV may support the weight of the UAV when the UAV is not airborne. In some instances, a landing area may have one or more contact portion that may contact the landing stand. In some instances, the contact portions may be sized and/or shaped to accommodate a landing stand of the UAV. Optionally, different landing areas configured to accommodate different UAVs may have different contact portion arrangements to accommodate different landing stands of the UAV. Optionally, contact portions may include guides that may guide the landing stand of the UAV to a desired landing spot. The guides may be passive guides, such as cones or funnels that may direct the landing stand to a desired location with the aid of gravity.

The different types of UAVs may have batteries housed in different manners. The batteries from the different types of UAVs may be inserted and/or removed in different manners. For example, if a battery is provided within a housing of the UAV, a door or opening through which the battery may be inserted or removed may be located in different regions of the UAV, or have different dimensions or specifications. In some instances, the batteries from the different types of UAVs may have different form factors, weights, dimensions, and/or battery chemistries.

In other embodiments, different zones may be capable of accepting UAVs of multiple types. One or more zones may be capable of accepting UAVs of multiple types. Optionally, each of the zones may be capable of accepting different UAVs without regard to their types, or for a wide range of types.

A UAV 210 may communicate 250 with a battery station 220. The UAV 210 may provide information to the battery station 220. The battery station 220 may use the information to determine a zone 230a, 230b in which the UAV 210 is to land. The battery station 220 may provide an indicator to the UAV 210 which zone into which the UAV 210 is to land. The UAV 210 may land in the corresponding zone in response to the indicator.

The UAV 210 may form a communication link 250 with the battery station 220. Examples of various types of communications are described in greater detail elsewhere herein. The UAV 210 may provide information about the UAV 210 and/or the battery of the UAV 210. For example, the UAV 210 may send information about a state of charge of the battery to the ground station. The UAV 210 may send additional information about the battery, such as the battery life at maximum capacity, the battery chemistry, the type of battery, the form factor of the battery, the weight of the battery, and/or the battery chemistry. The UAV 210 may send information about the UAV 210 to the ground station 220. For example, the UAV 210 may send information about the UAV type (e.g., make, model), the dimensions of the UAV, the form factor of the UAV, the weight of the UAV, the configuration of the battery storage for the UAV, and/or the configuration of an insertion or removal point for the battery of the UAV 210. The UAV 210 may also send information that may pertain to one or more goals of the battery life reload. For example, the UAV 210 may send information relating to a continued flight plan, distance to travel, loads carried by the UAV, timetables, whether a fast recharge is desired, UAV priority level, whether an energy efficient recharge is desired, whether a cost efficient recharge is desired, whether a prolonged battery life recharge is desired, whether there is a preference for recharging an existing battery vs exchanging the battery for another battery, or any other types of goals.

A battery station 220 may send information to the UAV 210. Information from the UAV 210 may include information about the battery station location and/or functionality. For example, the battery station 220 may include information about whether any batteries are available at the battery station 220 and/or state of charge of the batteries. Optionally, the battery station 220 may include information about the various landing zones and any specifics about the landing zones. For example, the battery station may include information about whether any of the landing zones are occupied or unoccupied, or whether the landing zones operate in accordance with any energy provision rules, or accommodate particular types of UAVs.

In some embodiments, communications between the UAV 210 and the battery station 220 may relate to relative locations between the UAV 210 and the battery station 220. The UAV 210, battery station 220, or both may have a GPS unit that may provide information about the location of the UAV 210 and/or battery station 220. Global coordinates may be exchanged between the UAV 210 and the battery station 220. This may aid in the UAV 210 navigating to the battery station 220.

The battery station 220 may use the information from the UAV 210 to determine a zone 230a, 230b at which the UAV 210 is to land. In some instances, specific zones may be designed to accomplish specific needs or specifications. In other examples, different zones may be able to accommodate multiple needs of the UAV, and one may be selected in accordance with occupancy or preference, or may be selected randomly. The battery station 220 may have a processor on-board that may make the determination regarding which zone the UAV 210 is to land. In other instances, an external device, or the UAV 210 itself may make the determination or aid in making the determination. Processors on-board the external device and/or the UAV 210 may, individually or collectively, aid one or more processors on-board the battery station in determining a landing zone selection and/or schedule for various UAVs.

The battery station 220 may provide an indicator to the UAV 210 at which zone to land. The indicator may include a communication back to the UAV 210. The communication may be sent back to the UAV 210 via a wireless signal, such as a communication link 250 with the UAV 210. In some instances, the indicator may include a visual marker that may be displayed on the battery station 220. The UAV 210 may capture an image of the visual marker. The UAV 210 may be able to determine which zone in which to land based on the visual marker. In other instances, the marker may not be detectable in a visible spectrum, but may include infrared markers, ultraviolet markers, patterns of blinking lights, sounds, vibrations, acoustic signals, radio signals, or any other type of indicator.

Based on the indicator, the UAV 210 may determine which zone at which to land. For example, an indicator may indicate the UAV 210 is to land at a first landing area 230a. The UAV 210 may accordingly land at the first landing area. The UAV 210 may be capable of landing autonomously without requiring any input from a remote user. In other instances, the UAV 210 may be semi-autonomous, and may be able to land at the landing area after receiving a command from the UAV 210 to land. In other instances, a remote user may manually control the landing of the UAV 210 on the landing area.

The battery station 220 may optionally be portable. The battery station may be capable of being moved from one location to another. The battery station 220 may be moved using human power. For example, a human may be capable of lifting the battery station. The human may be able to lift the battery station using one or two arms. Optionally, the battery station may weigh less than or equal to about 100 kg, 70 kg, 60 kg, 50 kg, 40 kg, 30 kg, 20 kg, 15 kg, 10 kg, 8 kg, 7 kg, 6 kg, 5 kg, 4 kg, 3 kg, 2 kg, 1 kg, 0.5 kg, or 0.1 kg. The battery station may have a maximum dimension that does not exceed about 2 m, 1.5 m, 1.2 m, 1 m, 90 cm, 80 cm, 70 cm, 60 cm, 50 cm, 40 cm, 30 cm, 20 cm, 10 cm, 5 cm, or 1 cm. The battery station may have a volume of less than or equal to about 8 $m^3$, 6 $m^3$, 4 $m^3$, 3 $m^3$, 2 $m^3$, 1 $m^3$, 0.5 $m^3$, 0.1 $m^3$, 0.05 $m^3$, or 0.01 $m^3$. In some instances, the battery station may be configured to collapse or fold into a smaller volume from a larger volume.

Figure 3:
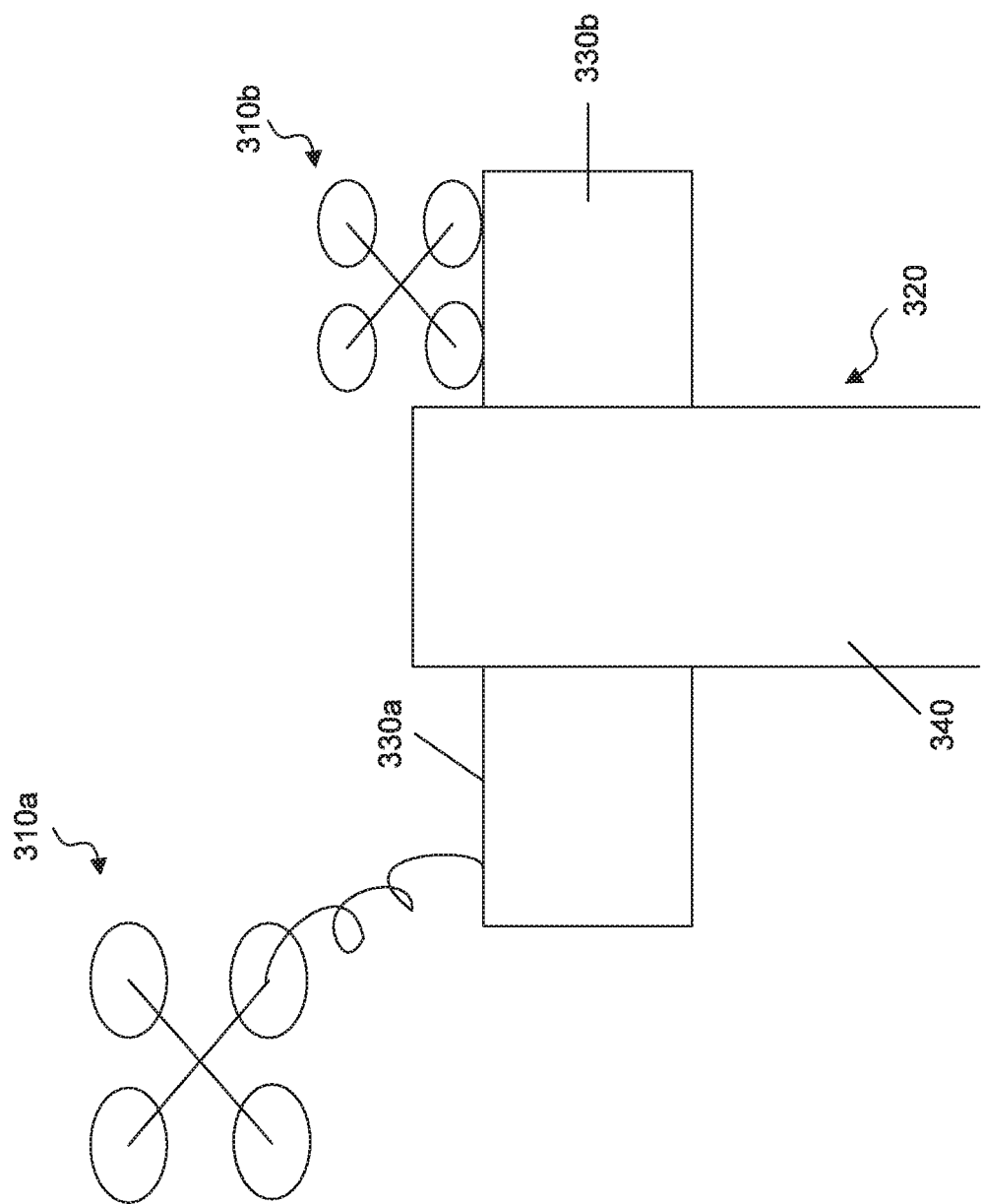
FIG. 3 shows an example of a multi-zone battery station interacting with a plurality of UAVs simultaneously in accordance with an embodiment of the invention.

FIG. 3 shows an example of a multi-zone battery station interacting with a plurality of UAVs simultaneously in accordance with an embodiment of the invention. A battery station 320 having multiple zones 330a, 330b may be capable of interacting with a plurality of UAVs 310a, 310b simultaneously. The multiple zones 330a, 330b may or may not share a common base or support structure 340.

In some instances, multiple UAVs 310a, 310b may be in flight and may need to reload battery life. The UAVs 310a, 310b may interact with a battery station 320 to reload battery life. By having multiple zones 330a, 330b, the battery station 320 may be capable of reloading battery life for multiple UAVs 310a, 310b at a time. The UAVs 310a, 310b may land and take off from the various landing zones independent of occurrences on other zones. For example, UAVs 310a, 310b may land and/or take off from a first landing zone without regard to the UAVs landing and/or taking off from the second landing zone. The traffic in each landing zone may be operated independently of one another. Multiple streams of UAVs 310a, 310b may have battery life reloaded in parallel by a battery station. A first stream of UAVs may have battery life reloaded thereon in a first zone while a second stream of UAVs may have battery life reloaded thereon in a second zone. As illustrated, a first UAV 310a may be taking off from a first landing zone while a second UAV 310b is resting on a second landing zone. The first and second UAVs may be capable of resting on their respective landing zones at the same time. The first and second UAVs may be capable of having battery life reloaded therein at their respective landing zones in parallel.

A UAV 310a may be in flight and in need of reloading battery life. The UAV may encounter the battery station 320 having multiple landing areas 330a, 330b. In some instances, one of the landing areas 330b may already be occupied with another UAV 310b. The UAV 310a may land at an unoccupied landing area 330a. In some instances, the battery station 320 may communicate to the UAV 310a which landing area is unoccupied. In other instances, the UAV 310a may be capable of detecting, using one or more sensors of the UAV, which landing area is unoccupied. In some instances, the battery station may provide an indicator that may be received and/or detected by the UAV to land at the unoccupied landing area. In some instances, the UAV 310a may land in any unoccupied landing area, or any specified unoccupied landing area.

In other embodiments, the different zones may operate in accordance with different energy provision rules, or may support specific types of UAVs 310a, 310b. The UAV may wait to land at a designed zone, even if another zone is unoccupied. For example, if a landing area 330b is occupied but is configured to follow a particular set of energy provision rules, or support a particular type of UAV while the other landing area 330a does not, and the UAV in flight 310a is of the particular type or needs to follow the particular set of energy provision rules, the UAV may wait until the landing area 330b becomes unoccupied. The UAV may wait by hovering, circling the ground station, or resting on another landing area without reloading battery life.

UAVs may be directed to different landing zones 330a, 330b. In some instances, UAVs of a first type may be directed to a first landing zone 330a while UAVs of another type are directed to a second landing zone 330b. For instances, UAVs may be directed to the first or second zone depending on their form factor, dimensions, landing stand configuration, weight, propulsion unit configuration, or any other characteristic. In some instances, UAVs having a battery of a first type may be directed to a first landing zone, while UAVs having batteries of a second type are directed to a second landing zone.

In some instances, UAVs to have battery life reloaded in accordance with a first set of energy provision rules may be directed to a first landing zone 330a while UAVs to have battery life reloaded in accordance with a second set of energy provision rules may be directed to a second landing zone 330b. In one example, UAVs having a higher priority mission, or tagged with a higher priority may be directed to a first landing zone while lower priority UAVs are directed to a second landing zone. Alternatively, UAVs with higher priorities may be scheduled to land at a landing zone earlier than UAVs with lower priorities. In another example, UAVs requiring a faster energy reload may be directed to a first landing zone, while UAVs that do not require a faster energy reload may be directed to a second landing zone. Alternatively, UAVs requiring a faster energy reload may be scheduled to land at a landing zone earlier than UAVs not requiring as fast a reload. In another example, UAVs to have an energy reload via recharging a battery may be directed to a first landing zone while UAVs to have an energy reload via a battery swap may be directed to a second landing zone. Additional descriptions of differentiation between different energy provision rules, such as those mentioned elsewhere herein, may be used to differentiate the landing zones for the UAVs.

Alternatively, different landing zones need not be dedicated to specific energy provision rules, and UAVs may be scheduled to land at various landing zones based on a timing aspect without regard to energy provision rules.

Figure 4:
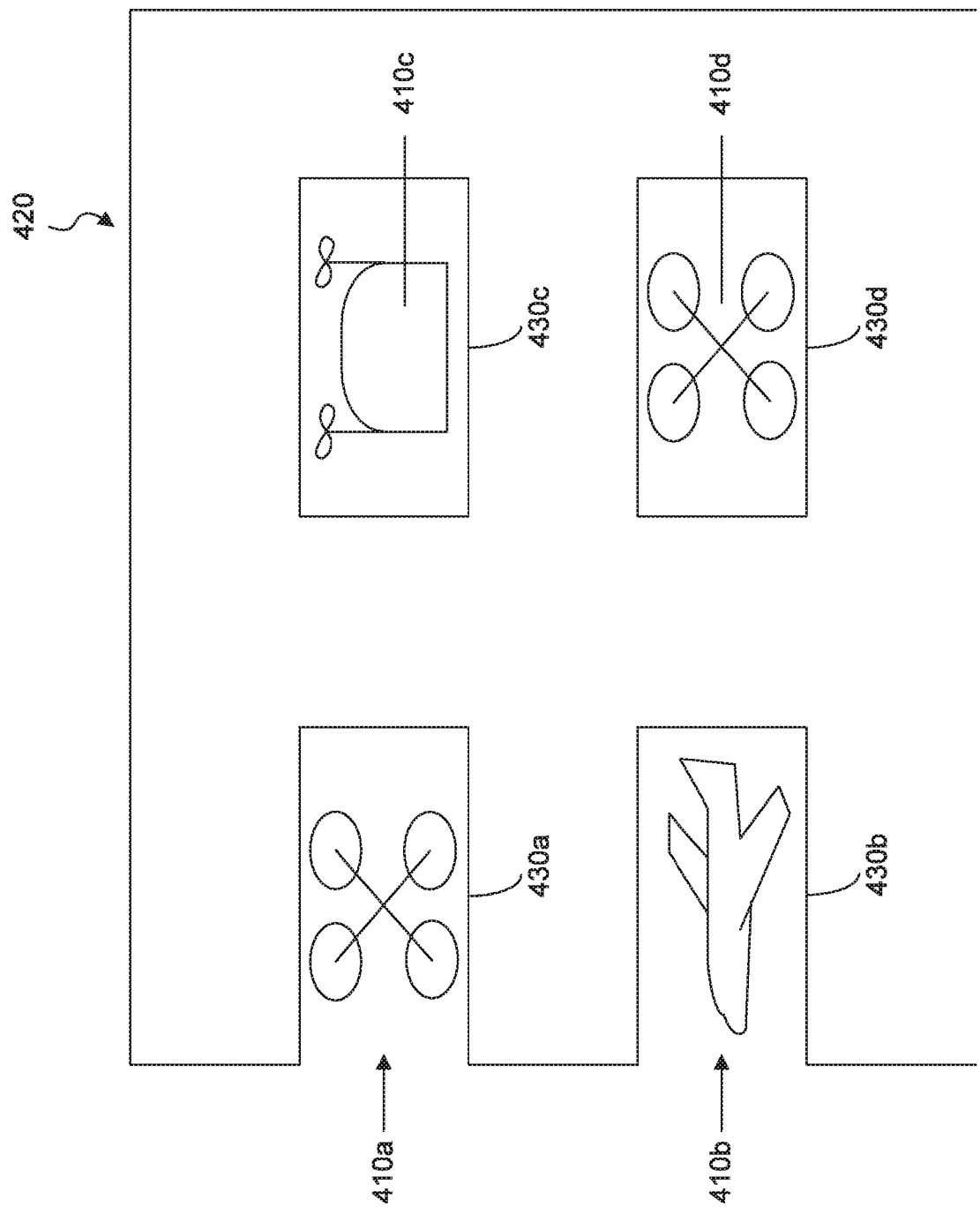
FIG. 4 shows an example of an alternatively configuration of a multi-zone battery station having multiple landing bays in accordance with an embodiment of the invention.

FIG. 4 shows an example of an alternatively configuration of a multi-zone battery station having multiple landing bays in accordance with an embodiment of the invention. A battery station 420 may have any configuration of the zones 430a, 430b, 430c, 430d that may serve as landing areas for UAVs. In some instances, the landing areas may be a platform upon which the UAV may rest. The platform may be substantially flat, curved, or have any configuration that may permit the UAV to land on the landing area. The platform may be provided on a top or upper surface of the battery station. The platform may extend from a side of the battery station. The landing area may optionally be exposed to the ambient environment. For example, the landing area may not have any walls, ceilings, or covers. In other instances, the landing area may have a wall, ceiling, and/or cover for the landing area. For example, a cover may be provided that may move between an open and closed position. The cover may enclose the UAV while the UAV is having battery life reloaded therein (e.g., recharging the battery or swapping out the battery for another battery). The cover may open to permit the UAV to take off and/or while the UAV is landing.

In some instances, the zones may be partially or completely protected from the ambient environment. In one example, the battery station may have one or more landing bays 430a, 430b, 430c, 430d. The landing bay may have a lower surface upon which the UAV may land or rest. The landing bay may optionally have a ceiling that may partially or completely overlie the UAV when the UAV is at rest. In some instances, one or more side walls may be provided for a landing bay. The landing bay may include an open side through which the UAV may fly in or out of the landing bay. The open side may remain open while the UAV is inside or outside the landing bay. The open side may remain open while the UAV is reloading battery life for the UAV. In other implementations, the open side may have a door or cover that may open or close the side. In some instances, the door may be opened to permit the UAV to enter or exit the bay. The door may optionally be closed while the UAV is reloading battery life and/or while the bay is empty.

Landing bays may be oriented in any manner. For example, an open side of a landing may be provided on one or more sides of the battery station. The ground station may have an overall footprint having any shape. For example, the battery station may have a lateral cross section that is substantially a square, rectangle, circle, ellipse, triangle, pentagon, hexagon, octagon, crescent, or any other regular or irregular shape. Openings for landing bay may be on one, two, three, four or more sides of a battery station. In some instances, landing bays may be provided at different heights of the battery station. In some instances, a floor of a first landing bay may also be a ceiling of a second landing bay that is beneath the first landing bay.

In other examples, the zones may be completely within a housing the battery station. In some instances, the UAV may enter the ground station through a side of the battery station. For example, one or more opening may be provided on a side of the battery station. In other instances, the UAV may enter a battery station through a top of the battery station. One or more opening may be provided on a ceiling of the battery station. For example, a roof or ceiling of the battery station may open up to permit the UAV to land on a landing area inside.

In some embodiments, UAVs 410a, 410b, 410c, 410d that may be capable of landing on the landing zones may have any configuration. The UAVs 410a, 410b, 410c, 410d may have different configurations (e.g., 410a, 410b, 410c) or may have the same configuration (e.g., 410a, 410d). The various landing zones may be dedicated to particular types of UAVs. For example, a first landing zone 430a may be configured to accommodate a UAV of a first type 410a, while some of the other landing zones 430b, 430c may not be configured to accommodate the UAV of the first type. Optionally, an additional landing zone 430d may be configured to accommodate a UAV of the first type.

The landing zones for different types of UAVs may have different physical characteristics. For example, a landing zone configured to accommodate a larger UAV may have a larger size or may be capable of supporting a larger amount of weight than a landing zone configured to accommodate a smaller UAV. In another example, the landing zone configured to accommodate an elongated UAV may have a longer shape than a landing zone configured to accommodate a more compact UAV. A landing zone configured to accommodate a taller UAV may have a higher ceiling or cover than a landing zone configured to accommodate a shorter UAV. A landing zone configured to accommodate a UAV that takes off vertically may have a different configuration from a landing zone configured to accommodate a UAV that needs a runway or slingshot to take off.

Figure 5:
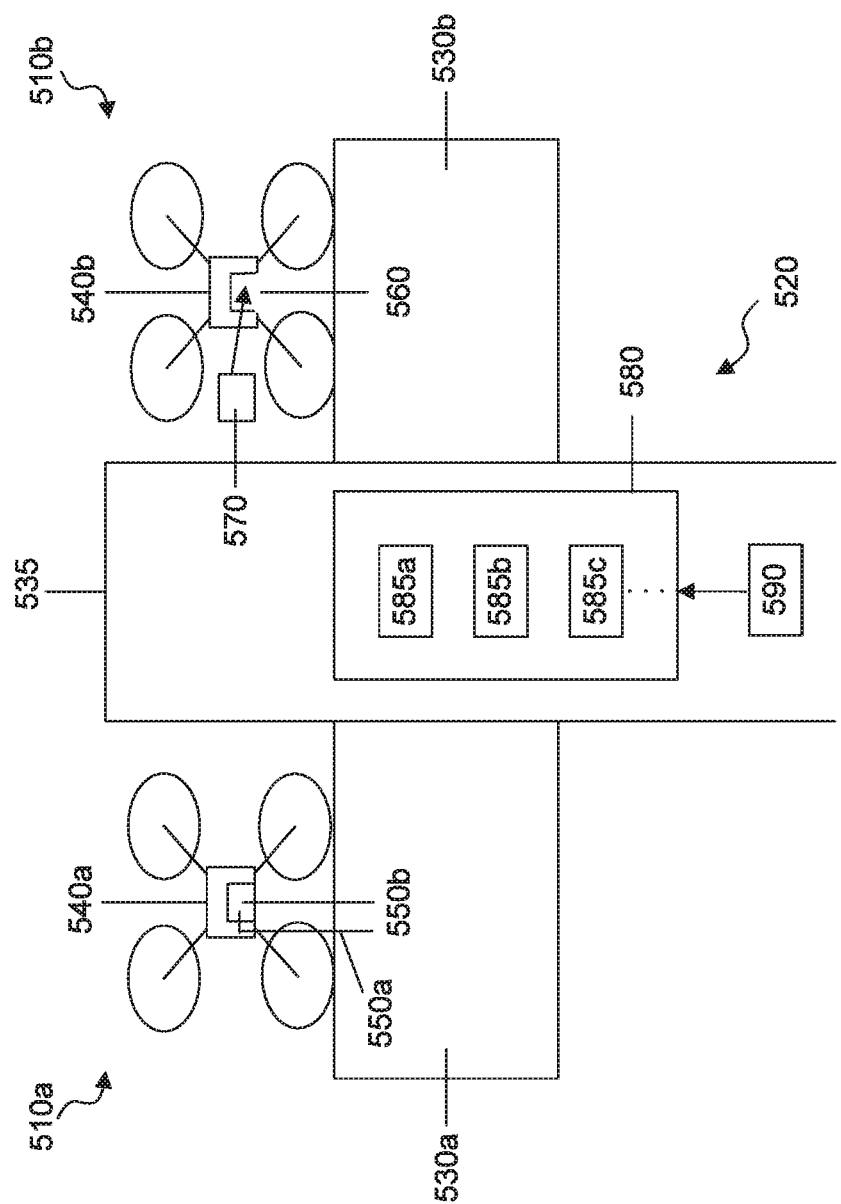
FIG. 5 shows an example of multiple UAVs on a multi-zone battery station having battery life reloaded using multiple different techniques in accordance with an embodiment of the invention.

FIG. 5 shows an example of multiple UAVs on a multi-zone battery station having battery life reloaded using multiple different techniques in accordance with an embodiment of the invention. A first UAV 510a may land on a first zone 530a of a battery station 520 while a second UAV 510b may land on a second zone 530b of the battery station. The zones of the battery station 520 may or may not share a common base 535.

Each UAV may have a body 540a, 540b. The body may have a compartment 560 which may be capable of storing a battery 550b thereon. The battery may be coupled to the UAV to power one or more components of the UAV. Battery life may be reloaded onto the UAV when the battery life of the UAV has been depleted.

In one embodiment, battery life may be reloaded by recharging the battery 550b of the UAV 510a. The battery of the UAV may be recharged while the battery remains on board the UAV. A charging connector 550a may be provided which may couple the battery station 520 to the UAV. A first zone 530a which may permit recharging the battery on board the UAV may have a charging connector thereon. The charging connector may electrically couple the battery of the UAV to a power source. The power source may be provided via the battery station 520. Examples of the power source may include, but are not limited to, a utility grid power source, an off-grid power source, a renewable energy source, and/or an energy storage device, such as one or more batteries. The energy storage device may be coupled to a utility grid power source, an off-grid power source, and/or a renewable energy source. Examples of renewable energy sources may include photovoltaic devices, solar thermal devices, wind generation devices, water generation devices, geothermal devices, or any other type of renewable energy device.

The charging connector 550a may be configured to couple with a portion of the UAV. The charging connector may couple with a port in a housing of a UAV, a surface of the UAV, an protrusion of the UAV, or an indentation of the UAV. The charging connector may electrically couple the battery on-board the UAV to the power source. The charging connector may or may not directly contact the battery. The charging connector may be configured to interface with a particular UAV type or a plurality of different UAV types. The charging connector may be configured to interface with a particular battery type or a plurality of battery types. The charging connector may have different interfaces that may be matched with different UAV types or different type of batteries.

In some instances, multiple charging connectors may be provided at an energy provision station or landing zone. The multiple charging connectors may each be designed to interface with different UAV types or different battery types. In some instances, a type of UAV or battery type may be detected prior to the UAV landing at a landing zone, or after the UAV has landed at the landing zone. A charging connector may be selected from multiple available charging connectors. The selected charging connector may be selected to interface with a detected UAV or detected battery type. In some instances, the non-selected charging connectors from the multiple available charging connectors may not be configured to interface with a detected UAV or detected battery type.

In another example, a single charging connector may have multiple charging interfaces. Each of the charging interfaces may be may be designed to interface with different UAV types or different battery types. The charging interfaces may have different components, dimensions, shapes, or physical features. For example, one charging interface configuration may have a diameter of 1 inch and three prongs, while another charging interface configuration may have a diameter of half a inch with two prongs. Similarly, a charging connector may have a charging interface that may be reconfigurable between different charging interface configurations. In some instances, a type of UAV or battery type may be detected prior to the UAV landing at a landing zone, or after the UAV has landed at the landing zone. A charging interface of a charging connector may be selected from multiple available charging interfaces, or an existing interface may be reconfigured to a selected configuration. The selected charging interface or interface configuration may be selected to interface with a detected UAV or detected battery type. In some instances, the non-selected charging interface or interface configurations may not be configured to interface with a detected UAV or detected battery type.

The UAV may automatically connect to the charging connector when the UAV lands on the first zone. In some instances, one or more sensors of the first zone may detect when the UAV lands at the first zone. In some instances, when the UAV lands at the first zone, the UAV may be connected to the charging connector without requiring any additional action by the UAV or the charging connector. In other instances, the charging connector may be actuated to connect to the UAV. In one example, the charging connector may include a portion that may move and/or extend to contact a portion of the UAV. A UAV may have a charging port configured to contact a charging connector. The charging connector may come into contact with the charging port of the UAV, thereby forming an electrical connection with a battery on-board the UAV. In some embodiments, the charging connector of the battery station may be inserted into the charging port of the UAV, or the charging port of the UAV may include a portion that may be inserted into a charging connector of the battery station. In some embodiments, one or more magnets may be provided that may aid in aligning the charging connector of the battery station with the charging port of the UAV.

In some instances, the UAV may be powered by the battery while the battery is being recharged on board the UAV. In other instances, the UAV may be powered off while the battery is being recharged on board the UAV.

Optionally, the first zone 530a may permit recharging of the battery while the battery is on-board the UAV 510a. The first zone may or may not permit the battery to be removed or decoupled from the UAV. The first zone may or may not have infrastructure that may remove or decouple the battery from the UAV.

A second zone 530b may permit a battery to be removed or decoupled from a UAV 510b. In some instances, a battery may be removed from a UAV to exchange the battery for another battery to be inserted into the UAV. In other instances, the battery may be removed from the UAV to charge the battery and then recouple the battery to the UAV.

A battery replacement member may be provided which may decouple a battery from the UAV. In some instances, the battery replacement may be a robotic arm or extension that may decouple the battery from the UAV. The battery replacement member may remove a battery from a recessed portion 560 of a UAV body 540b. The battery decoupled from the UAV may be transported to a battery storage unit 580. In some instances, a battery decoupled from the UAV may be transported to a separate charging unit. In some instances, the battery storage unit may serve as a charging unit. Alternatively, the battery decoupled from the UAV may be transported to a region to be discarded.

A battery storage unit 580 of a battery station 520 may be configured to store one or more batteries 585a, 585b, 585c. The battery storage unit 580 may be capable of simultaneously storing one or more, two or more, three or more, four or more, five or more, six or more, eight or more, ten or more, twelve or more, fifteen or more, twenty or more, thirty or more, forty or more, or fifty or more batteries. The battery storage unit 580 may be partially or completely enclosed in a housing of the battery station. A common battery storage unit 580 may be shared between multiple zones 530a, 530b. Alternatively, a single zone may have its own battery storage unit 580. In some instances, a single zone may or may not share a battery storage unit 580 with another zone. Optionally, a battery station may have multiple battery storage units, each of which may be devoted to a single zone, or multiple zones. In some embodiments, all zones of a battery station may have access to a battery storage unit, whether they be shared battery storage units, or individualized battery storage units. Alternatively, one or more zones of a battery station may not have access to a battery storage unit. The battery storage unit may store a battery within a port of the battery storage unit. The ports may have a fixed location. Alternatively, the ports may be movable. In some instances, the battery storage unit may permit a plurality of ports and/or batteries coupled thereto to move. The plurality of ports/batteries of the battery storage unit may be capable of moving simultaneously. The movement may occur with aid of one or more actuators such as one or more motors.

A battery storage unit charger 590 may be provided to charge one or more batteries 585a, 585b, 585c of the battery storage unit 580. The battery storage unit charger 590 may include a power source, or may couple one or more batteries in the battery storage unit to a power source. Examples of the power source may include, but are not limited to, a utility grid power source, an off-grid power source, a renewable energy source, and/or an energy storage device, such as one or more batteries. The energy storage device may be coupled to a utility grid power source, an off-grid power source, and/or a renewable energy source. Examples of renewable energy sources may include photovoltaic devices, solar thermal devices, wind generation devices, water generation devices, geothermal devices, or any other type of renewable energy device. The batteries in the battery storage unit may be charged to their full capacity. Alternatively, they may be charged to any other selected state of charge.

A battery from a UAV 510b may be removed from the UAV, and transported via a battery replacement member to a battery storage unit 580. In some instances, another battery 570 may be removed from the battery storage unit and may be transported via the battery replacement member to the UAV. The battery replacement member may insert or couple the new battery to the UAV, thereby exchanging the previous battery for the new battery. The new battery may have a higher state of charge than the original battery on-board the UAV. In some instances, the original battery on-board the UAV may have been depleted. The new replacement battery may be fully charged, or may have a higher state of charge, thereby permitting the UAV to travel for an extended period of time. The original battery from the UAV may be stored in the battery storage unit. The original battery may be charged while the original battery is stored in the battery storage unit. When another UAV lands at the zone, the original battery may optionally be one of the batteries from which a new replacement battery may be selected.

In some other instances, after the battery from the UAV 510b is removed and transported to the battery storage unit, the battery may be charged while in the battery storage unit. In other instances, the battery may be transported to another portion of the battery station to be charged. After the battery has been charged to a desired state of charged (which may or may not be fully charged), the battery replacement member may transport the battery 570 back to the UAV to be recoupled to the UAV. The battery may then have a higher state of charge than it originally had when the UAV landed.

The battery replacement member may automatically initiate a sequence to decouple a battery from the UAV when the UAV lands on the first zone. In some instances, one or more sensors of the first zone may detect when the UAV lands at the first zone. The battery replacement member may be actuated to decouple the battery from the UAV. In one example, the battery replacement member may include a portion that may move and/or extend to contact a battery of the UAV. The battery replacement member may remove the battery from a recessed portion of the UAV. The battery replacement member may transport the battery from the UAV to another portion of the station. The battery replacement member may also provide a battery to the UAV and couple the battery to the UAV. The battery replacement member may insert the battery into a recessed region of the UAV. The battery that is coupled to the UAV may be the same as the original battery that was removed, or may be a new battery.

A battery station 520 may have multiple zones 530a, 530b. Optionally, each zone may be capable of both (1) charging a battery while it is on-board a UAV and (2) removing a battery from a UAV for exchange with another battery or recharging the battery. Infrastructure, such as a charging port and/or battery replacement member may be accessible via each zone. In some instances, each zone may have its own dedicated charging port. Alternatively, a charging port may be capable of servicing multiple zones. Similarly, each zone may have its own dedicated battery replacement member (e.g., robotic arm). Alternatively, a battery replacement member may be capable of servicing multiple zones. Alternatively, different zones may be capable of only one of: (1) charging a battery while it is on-board a UAV, or (2) removing a battery from a UAV for exchange with another battery or recharging the battery. Infrastructure may be accessible to only selected zones. In one instance, a first zone may have access to a charging port while another zone may not. Similarly, a second zone may have access to a battery replacement member while another may not.

In some embodiments, it may be desirable for reload energy onto a UAV quickly. Depending on the state of charge of a battery on-board the UAV, it may be quicker to recharge the battery on-board the UAV, or to exchange the battery for another battery. If the state of charge of the battery of the UAV is very low, it may take more time to charge the battery. If the state of charge of battery of the UAV is reasonably high, it may take more time to exchange the battery for another battery than to recharge the battery on-board. In some instances, depending on the battery characteristics, a threshold state of charge may be determined, beneath which it may be faster to exchange the battery for another battery, and above which it may be faster to recharge the battery on-board the UAV. Depending on the state of charge of the UAV, the UAV may be directed to a different landing zone. For example, if the state of charge of the UAV battery exceeds the predetermined threshold, the UAV may be directed to a first landing zone for the battery to be recharged on-board the UAV. If the state of charge of the UAV battery falls beneath the predetermined threshold, the UAV may be directed to a second landing zone for the battery to be exchanged for another battery.

Figure 6:
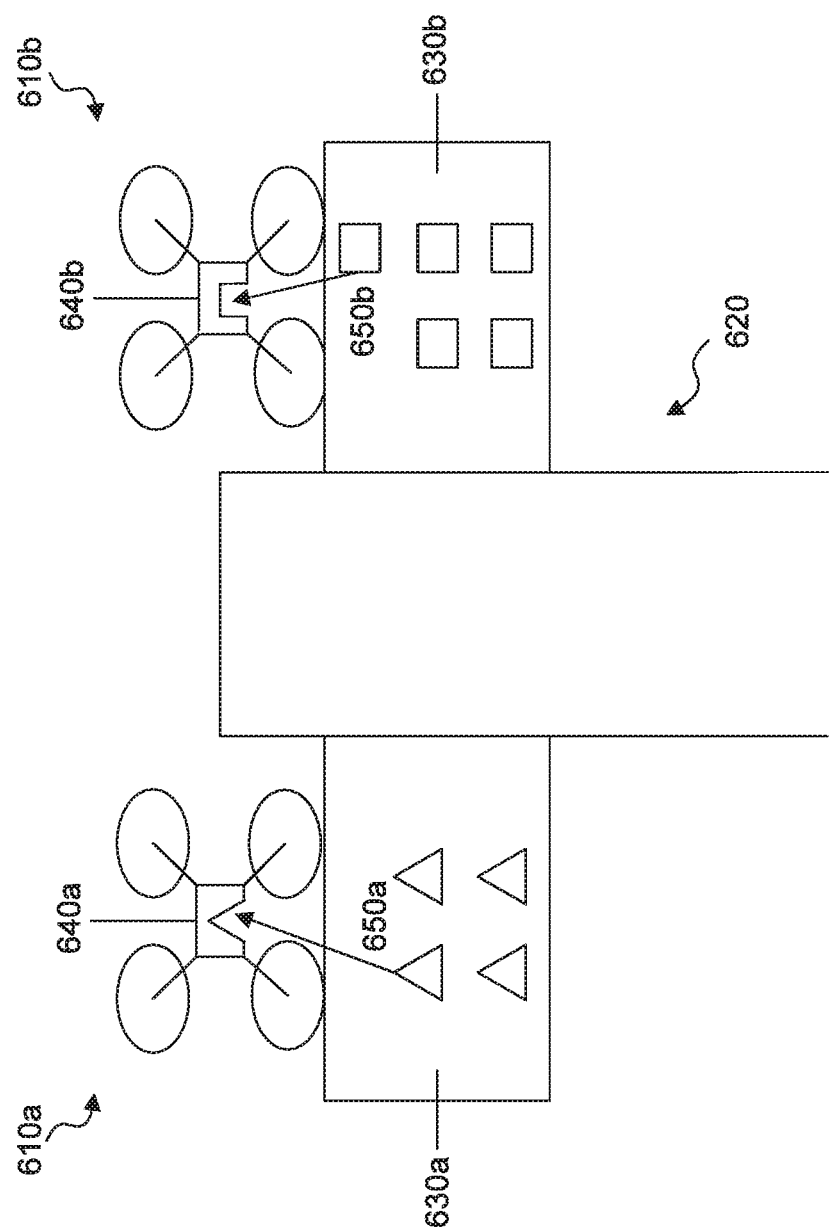
FIG. 6 shows an example of multiple UAVs on a multi-zone battery station having battery life reloaded in different zones dedicated to different batteries in accordance with an embodiment of the invention.

FIG. 6 shows an example of multiple UAVs on a multi-zone battery station having battery life reloaded in different zones dedicated to different batteries in accordance with an embodiment of the invention. A first UAV 610a may land on a first zone 630a of a battery station 620 while a second UAV 610b may land on a second zone 630b of the battery station. The zones of the battery station 620 may or may not share a common base.

Each UAV may have a body 640a, 640b. The body may have a compartment which may be capable of storing a battery 650a, 650b thereon. The battery may be coupled to the UAV to power one or more components of the UAV. Battery life may be reloaded onto the UAV when the battery life of the UAV has been depleted. The battery life may be reloaded by recharging the battery on-board the UAV, recharging the battery off-board the UAV at the battery station, or exchanging the battery for another battery. In some embodiments, each of the zones may be able to accommodate any type of energy provision rules, such as any technique for reloading battery life. In other instances, one or more of the zones may be dedicated to particular energy provision rules, such as particular techniques for reloading battery life, without accommodating other techniques for reloading battery life.

In some instances, a battery station 620 may be able to accommodate batteries of different types 650a, 650b. Different types of batteries may include batteries of different dimensions, weights, connectors, form factors, shapes, chemistries, maximum battery life, charging requirements, or other characteristics. Multiple zones of the battery station may each be able to accommodate batteries of different types. Alternatively, multiple zones of the battery stations may not each be able to accommodate batteries of different types. For example, a first zone of the battery station may be configured to accommodate a battery of a first type while not being configured to accommodate a battery of a second type, and a second zone of the battery station may be configured to accommodate a battery of a second type while not being configured to accommodate a battery of a first type.

A battery station may have one or more battery storage units. In some instances, a single battery storage unit may be capable of storing batteries of different types. Alternatively, a single battery storage unit may be capable of storing batteries of a single type. A battery storage unit may be configured to store a battery of a first type without being configured to store a battery of a second type. A battery storage unit storing batteries of multiple types may be able to distinguish the type of battery stored in each location within the battery storage unit. For instance, a first type of battery may be stored in a first port of a battery storage unit and a second type of battery may be stored in a second port of a battery storage unit. The battery storage unit may be able to detect the presence and/or type of battery stored in each port.

Multiple battery storage units may be provided for a battery station in accordance with an embodiment of the invention. A first zone 630a may have a first battery storage unit while a second zone 630*b* may have a second battery storage unit. Alternatively, the first and second zones may share a common battery storage unit, or a common set of battery storage units. In some instances, the battery storage unit of the first zone may be configured to accommodate a first battery type. The battery storage unit of the first zone may or may not be configured to accommodate a second battery type. The battery storage unit of the second zone may be configured to accommodate a second battery type. The battery storage unit of the second zone may or may not be configured to accommodate a first battery type. Accommodating a battery type may include accepting a battery of the type within a port of the battery storage unit. Accommodating a battery type may include charging a battery of the type within the battery storage unit. A zone may also be able to accommodate a battery of a particular type by being configured to charge the battery on-board the UAV. A zone may be configured to accommodate a battery of a particular type by being configured to decouple the battery of that type from the UAV and/or transport the battery to a battery storage unit or other portion of the station. The zone may be configured to accommodate a battery of a particular type by being configured to couple the battery of that time to the UAV and/or transport the battery from the battery storage unit or other portion of the station to the UAV.

Various zones 630*a*, 630*b* of a battery station may be dedicated to various battery types 650*a*, 650*b*. Different UAVs may use batteries of different types. In one example, a first UAV 610*a* may be configured to operate with a battery of a first type 650*a* and a second UAV 610*b* may be configured to operate with a battery of a second type 650*b*. The first UAV may land at a first zone that is configured to accommodate the first battery type. The second UAV may land at the second zone that is configured to accommodate the second battery type. The UAV may be able to discern which zone would accommodate the battery of the UAV battery's type and land accordingly. In some instances, communications may occur before the UAV lands at the battery station to determine which zone the UAV is to land at. The UAV may send information about battery type to the station, and the station may indicate to the UAV which zone at which to land.

In some instances, battery station infrastructure may be different to accommodate batteries of different types. For example, the battery storage unit may have different sizes or shapes of ports to accommodate batteries of different dimensions or shapes. The battery storage unit may be structurally reinforced to carry batteries of different weights. The battery storage unit may have different battery state reading mechanisms or charging mechanisms to accommodate batteries of different chemistries or other characteristics. Electrical connections for batteries may be located at different regions depending on the configuration of the battery. Similarly, a battery replacement member, such a robotic arm, may have different shapes or sizes to accommodate different sizes or shapes of batteries. The robotic arm may be reinforced to accommodate batteries of different weights. The robot arm may have a gripper or other component that may couple to the battery and may be configured to couple to batteries of multiple types or specific types.

In some instances the robotic arm may be employed in the landing of the UAV on the energy provision station instead of or in addition to swapping the battery on board the UAV. In some embodiments, a separate robotic arm from a battery replacement member may be used to aid the UAV in landing. Alternatively, the same robot arm may be used for battery replacement and to aid in landing. The UAV may approach the energy provision station, when the UAV is sufficiently close to the energy provision station the robotic arm may attach to the UAV and place the UAV in a preferred location for battery swapping on board the energy provision station. The robotic arm may detect the UAV using a sensor on the robotic arm. For example, the sensor may be a vision sensor, a motion sensor, an audio sensor, or any other sensor configured to detect a UAV in proximity to the robotic arm. The robotic arm may attach to the body of the detected UAV, the robotic arm may attach to the UAV using the terminal c shaped clamp. Alternatively the robotic arm may attach to the UAV magnetically, with Velcro, or by achieving positive mating between complimentary mating features on the UAV and the robotic arm. The UAV may turn off its rotors after being sized or grasped by the robotic arm.

The robotic arm may be specifically configured to seize the UAV from the air to place the UAV on the energy provision station. The robotic arm may telescope vertically from the energy provision station such that it may be in the proximity of a UAV approaching the energy provision station. The robotic arm may be raised at least 6 inches, 12 inches, 24 inches, 36 inches, 48 inches or 60 inches above the landing area of the energy provision station. The robotic arm may be raised above the energy provision station to detect an approaching UAV using a visual sensor. Additionally the robotic arm may rotate about an axis such that it can turn to face an incoming UAV. The robotic arm may move vertically, horizontally, and rotationally about a vertical and/or horizontal axis. Alternatively the robotic arm may be raised above the energy provision station after the GPS or RTK system on the energy provision station has detected a UAV in proximity of the energy provision station. Once the robotic arm is raised it may grasp an incoming UAV and then lower to the level of the landing area to place the UAV on the landing area of the energy provision station.

Figure 7:
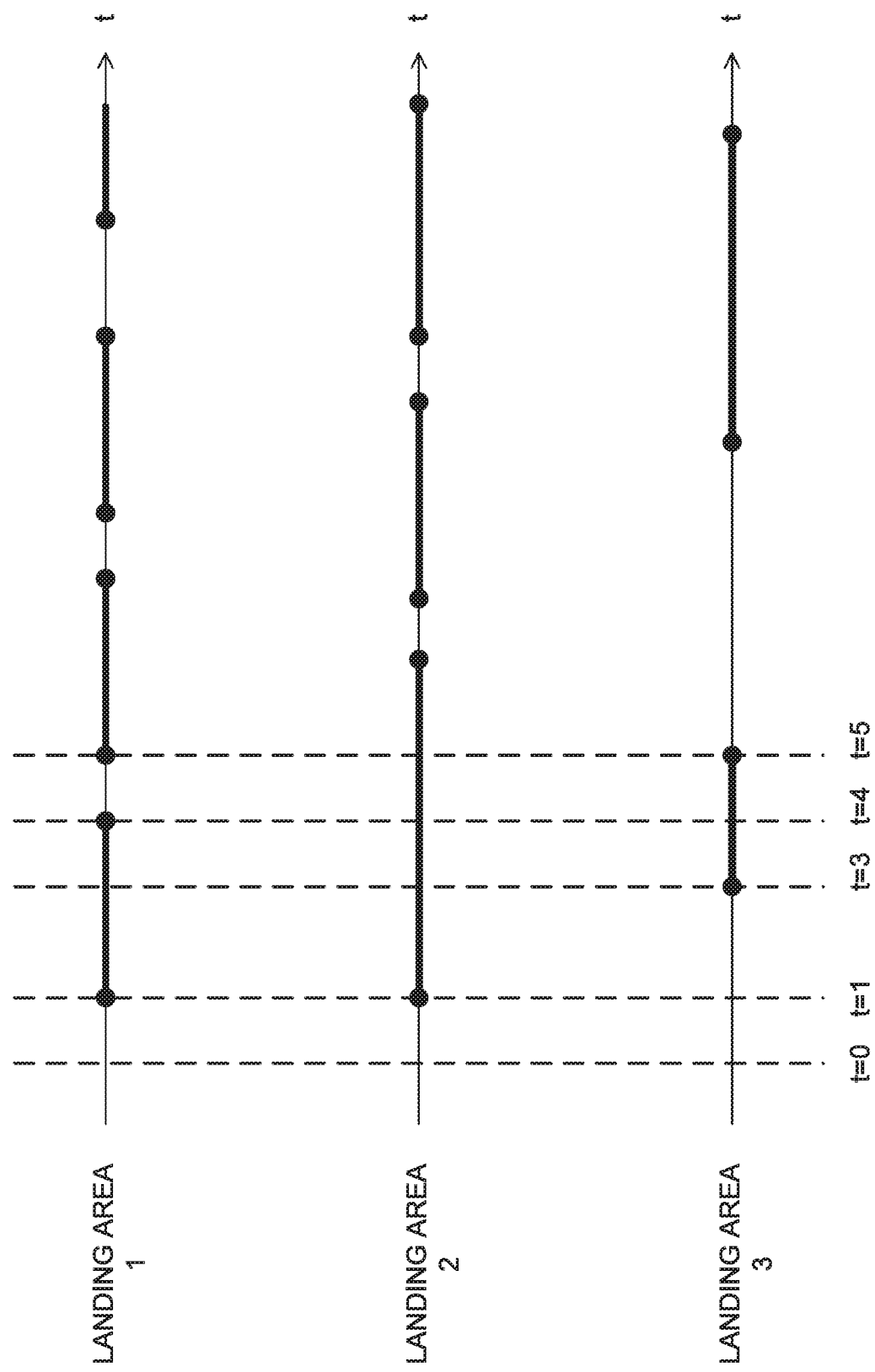
FIG. 7 shows an example of a landing schedule for multiple UAVs on different landing areas of a multi-zone battery station in accordance with an embodiment of the invention.

FIG. 7 shows an example of a landing schedule for multiple UAVs on different landing areas of a multi-zone battery station in accordance with an embodiment of the invention. A multi-zone battery station may have multiple landing areas upon which a UAV may land. The landing areas may have the same type of configuration or different configurations, as described elsewhere herein.

An illustrated, a first landing area (Landing Area 1), second landing area (Landing Area 2), and/or third landing area (Landing Area 3) may be provided. UAVs may land and/or take off from the various landing areas. This may occur in parallel between the multiple landing areas. A UAV may have battery life reloaded while the UAV has landed on the landing area. Alternatively, the UAV may be at rest while on the landing area without reloading battery life, or may have any other action or service performed for the UAV.

UAVs may be on the landing areas for any period of time. In some instances, the period of time the UAV is resting on a UAV may be regular (e.g., Landing Area 1 shows three time units every time a UAV is on the landing area) or may be irregular (e.g., Landing Area 2 shows varying numbers of time units every time a UAV is on the landing area). The period of time between UAVs landing on the landing area may be irregular (e.g., Landing Areas 1 and 3 shows varying units of time between each UAV take off and landing), or substantially regular (e.g., Landing Area 2 shows a relatively fixed number of units of time between take off a previous UAV and landing of a subsequent UAV.

In some instances, length of time a UAV is resting on a landing area may depend on the activity being performed while the UAV is resting on the landing area. For example, a battery of the UAV may be exchanged for another battery from the battery station. In some instances, this may be a relatively fixed length of time. For instance, once a UAV has landed, a battery replacement member may automatically remove a battery from the UAV, transport it to a battery storage unit, transport a new battery from the battery storage unit to the UAV and couple the new battery to the UAV. In another example, a battery may be charged on-board the UAV. This may occur over a length of time that may vary depending on the state of charge of the battery being recharged. For example, if the battery has a lower state of charge, it may take longer for the battery to be fully recharged than a battery that has a higher state of charge. The length of time may also depend on the battery capacity. In the illustration provided, Landing Area 1 may be used for battery exchange while Landing Area 2 may be used to recharge a battery. Landing Area 1 may show relatively regular periods of time that a UAV is on a landing area while Landing Area 2 may show greater variability. In some instances, depending on a state of charge of a battery, a UAV may be directed to a first landing area or a second landing area. For instance, if the length of time to recharge the battery exceeds the length of time to exchange the battery for another battery, then the UAV may be directed to Landing Area 1 to have the battery exchanged. If the length of time to recharge the battery is less than the length of time to exchange the battery for another battery, the UAV may be directed to Landing Area 2 to have the battery recharged. In one example, a third landing area (e.g., Landing Area 3) may be provided. The third landing area may be configured to recharge a battery on-board the UAV, exchange the battery, or both. Optionally, the third landing area may be an area for a UAV to wait without reloading battery life of the UAV. For example, one or more of the landing areas may already be occupied and a UAV may rest on the third landing area until the occupied landing area frees up.

In a high traffic regions, UAVs may be landing and/or taking off from landing areas fairly frequently. In some instances, prioritization of UAVs may be necessary. For example, multiple UAVs may approach a battery station for a limited number of landing areas. UAVs may be prioritized depending on mission of the UAV, state of charge of the UAV battery, or any specifics of the UAV configuration or charging. The UAVs may be scheduled to have battery life reloaded depending on the priority and/or availability of the landing areas. For example, if a UAV is a high priority UAV, and one of the landing areas is configured to reload battery life more quickly, the UAV may be directed to the "faster" landing area. If a UAV has a lower priority (e.g., less urgent mission, greater state of charge), the UAV may be directed to the "slower" landing area. In some instances, UAVs may hover or circle the battery station while waiting their turn. In other instances, UAVs may rest on other landing areas while waiting their turn.

In some instances, a queuing region may be provided. The queuing region, or queuing "dock" may provide an area for UAVs to queue while awaiting their turn to be charged at a landing zone. In some instances, a single queue may be provided for the battery station, and the UAV may be shunted from the queuing region to the appropriate zone, and the appropriate zone frees up. In some instances, the next UAV in the queue is automatically directed to the next zone that opens up. For example, a first in-first out system may be used. Alternatively, the next UAV in the queue may be assigned a different zone, in which case the first UAV in the queue that is assigned to the free zone may be directed to the free zone. Alternatively, each zone may have its own dedicated queuing region. For example, a first queuing region may direct UAVs to a first landing zone, while a second queuing region may direct UAVs to a second landing zone.

Optionally, UAVs may approach the landing station and may be entered into the queue. In some instances, the last UAVs to arrive may automatically be placed at the end of the queue. In other instances, depending on various factors, the UAV may be positioned at a different location along the queue. For example, if the UAV has an urgent mission, the UAV may be moved to the front of the queue ahead of UAVs with less urgent missions. The queue sequence can be determined by one or more layers. Alternatively or additionally, the queue sequence can be determined by weights.

One or more layers may be provided for determining a UAV queue sequence. In some instances a primary layer and secondary layer may be provided. Any additional number of layers may be provided, such as a third layer, fourth layer, fifth layer, or any additional layers. In one example, a primary layer may be UAV status. For example, whether the UAV has a priority status, or any other type of specialized status. In some instances, UAVs with more important or urgent missions may be provided with a higher or specialized status. A secondary layer may be the amount of energy relating. For example, a UAV having a lower state of charge may be placed earlier in the queue than a UAV with a higher state of charge. The having a lower percentage of energy, or lower remaining life on the battery with anticipated use may place the UAV earlier in the queue. A third layer may include how long a UAV has been delayed. For example, a UAV that has been waiting for a charge for a longer period of time may be earlier in the queue than a UAV that arrived more recently. In some instances, the queuing may be assessed strictly by layers. In other instances, weighting may occur between the different factors. For example, a UAV position in queue may be determined by a numerical score that may be ranked, where the score is a weighted average of any number of factors, such as the three factors described herein. For example, three different factor categories may be assessed, where the first category is weighted twice as much as the second and third categories. For example, a first UAV may have a score of 70 (40/50 for status, 17/20 for amount of energy remaining, and 13/20 for time delayed) while a second UAV may have a score of 80 (45/50 for status, 15/20 for amount of energy remaining, and 20/20 for time delayed) and may therefore by placed earlier in the queue than the first UAV.

In some embodiments, the queuing region may be a stationary region or surface upon which the UAVs may rest. In other instances, the queuing regions may be a movable region. For example, the queuing region may be a conveyer belt or include a similarly moving surface. The conveyer belt may move the UAV to the appropriate zone. The conveyer belt may remain stationary while all the zones are being used. When a zone opens up, the conveyer belt may move the appropriate UAV to the free zone.

Having a battery station with multiple landing zones may permit the battery station to accommodate a high level of UAV traffic. The multiple landing zones may be specialized to provide different types of services. The multiple landing zones may also be specialized to accommodate different priorities of UAVs. The multiple landing zones may be able to accommodate UAVs of different types or batteries of different types and may advantageously provide flexibility in servicing a wide range of UAVs. This may be advantageous as extended UAV travel may increase, and various UAVs of different types may need to reload battery life. Having flexibility and ability to handle larger volumes of UAVs may permit the battery station to meet increased demand.

The battery station may be able to detect when one or more landing zones are occupied. The battery station may include a controller that may keep track of when the various landing zones are occupied or unoccupied. The controller may keep track of upcoming UAVs, and aid in scheduling the UAV landings on the battery station. The controller may select a landing zone for an upcoming UAV. The controller may select the landing zone based on information from the UAV (e.g., one or more of: UAV type, battery type, state of charge, mission information, energy provision rules) and/or sensors of the battery station (e.g., detecting when a landing area is occupied or unoccupied). The controller may control the markers to change to indicate that a landing zone is ready to accept a new UAV. The controller may make the determination to change the marker in response to one or more sensor that may detect when a UAV has taken off from a landing area.

Figure 8:
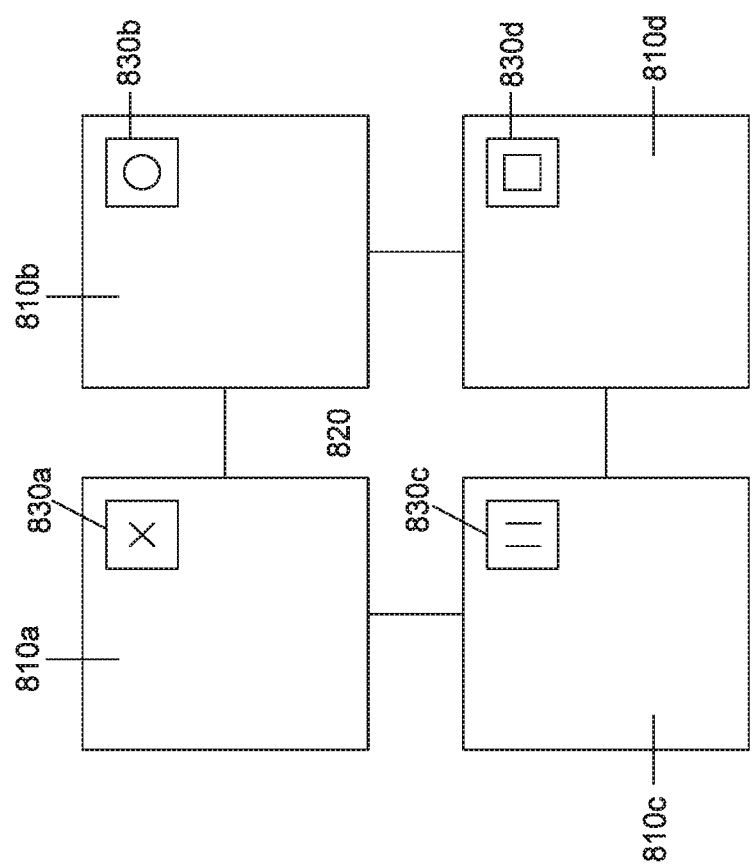
FIG. 8 shows an example of a top view of a battery station having landing markers in various landing areas of the battery station in accordance with an embodiment of the invention.

FIG. 8 shows an example of a top view of a battery station having landing markers in various landing areas of the battery station in accordance with an embodiment of the invention. In some embodiments, a battery station may have multiple landing areas 810a, 810b, 810c, 810d. The multiple landing areas may or may not share a common base 820. The landing areas may include markers 830a, 830b, 830c, 830d.

The multiple landing areas 810a, 810b, 810c, 810d may or may not be visually discernible from one another. The landing areas may have the same size or shape, or may have differing sizes or shapes. The landing areas may have similar orientations or may have different orientations. When a UAV is flying above a battery station, the UAV may be able to visually detect multiple landing areas.

Markers 830a, 830b, 830c, 830d may be provided that may aid in distinguishing multiple landing areas. The markers may be capable of being sensed by one or more sensor of the UAV. For example, the markers may be visible markers that may be sensed by one or more camera, or other type of vision sensor of the UAV. The visible marker may be viewable to the naked eye. The visible marker may include an image, shape, symbol, letter, number, bar code (e.g., 1D, 2D, or 3D barcode), quick response (QR) code, or any other type of visually distinguishable feature. The visible marker may include an arrangement or sequence of lights that may be distinguishable from one another. For examples, lights of various configurations may flash on or off. Any light source may be used, including but not limited to, light emitting diodes (LEDs), OLEDs, lasers, plasma, or any other type of light source. The visible markers may be provided in black and white or in different colors. The visible marker may be substantially flat, raised, indented, or have any texture.

In some instances, the marker may be detectable by an infrared or UV camera of a UAV. The marker may emit heat or other IR spectrum radiation, UV radiation, radiation along the electromagnetic spectrum. In another example, a marker may emit vibrations or sounds that may be picked up by a microphone or any type of acoustic sensor. The markers may emit different frequencies, pitches, harmonics, ranges, or patterns of sounds that may be detected by the UAV. For example, the sounds may include words, or musical tones. The vibrations/sounds may or may not be discernible by the human ear. In some instances, markers may emit wireless signals, such as radiofrequency signals, Bluetooth signals, Wifi signals or any other type of signals.

The UAVs may be able to sense and/or distinguish between different markers 830a, 830b, 830c, 830d. Thus, the UAV may be able to identify and distinguish between different landing areas. In some embodiments, a UAV may be able to arrive at a proximity of a battery station using GPS or other communications. The UAV may use the marker to determine which landing area at which to land. In some instances, the battery station may collect information about the UAV and select a landing area for the UAV. The battery station may communicate information about a marker corresponding to the selected landing area to the UAV. For example, the battery station may send information about a visual symbol to the UAV. The UAV may use a sensor to detect the symbol, and may land at a corresponding landing area. Alternatively, information about the marker may be pre-programmed or provided on-board the UAV. For example, a UAV may correspond to a particular marker that is unique to the UAV. For instance, a UAV may correspond to a particular QR code. The UAV may communicate information about the UAV's QR code to the battery station along with other information about the UAV. The battery station may cause the QR code to be displayed on one of the landing areas and the UAV may detect the matching QR code. The UAV may then land at the corresponding landing area.

In an illustration provided, the markers may be visually detectable by the UAV. The markers may be provided at the landing area. The markers may be provided on a platform on which the UAV may land. The markers may be located on a top surface of the landing area. The markers may be on a top surface of a battery station. The markers may be visually discernible from over the battery station. The line of sight may be provided between a marker and a space over the battery station. The markers may be provided on other portions of the battery station. For example, the markers may be provided on a side of the battery station or within a housing of the battery station. A marker may directly contact its corresponding landing area. The marker may contact is corresponding landing area on an upper surface, side surface, bottom surface, or interior surface. The markers across multiple landing areas may be provided at the same or similar portions of the landing area. For example, for multiple landing areas, visual markers may be provided on a North-East corner of each of the landing areas. The markers may aid the UAV in orientation and landing. The markers may be a fixed distance from a designed center landing region of the landing area.

The UAV may be able to distinguish between the different markers. The UAV may be able to visually distinguish between different visual markers. Accordingly, the UAV may detect its assigned visual marker and land at the corresponding landing area. The UAV may be able to detect and identify its assigned marker prior to landing (e.g., while the UAV is in flight above, or near, the battery station). The UAV may be able to adjust its flight path to land at the corresponding landing area.

For example, as shown in FIG. 8, the UAV may be assigned a visual marker of "X" 830a. The "X" marker may be unique to the UAV and pre-assigned or programmed for the UAV. In some instances, a marker may be unique to the UAV. The UAV may optionally communicate the UAV's marker information to a battery station. The battery station may then show the UAV's marker at a selected landing zone at a selected time. Alternatively, the battery station may assign the "X" to the UAV and communicate the assigned identifier to the UAV. Thus, the UAV may know which marker to search for. The UAV may approach a battery station and be able to detect the "X" as well as the other visual markers (e.g., "O", "||", "□") from above. One or more processors on-board the UAV may be able to distinguish the detected visual markers from one another. Image analysis may be performed on-board the UAV. The marker that matches the assigned marker may be detected (i.e., the UAV may recognize the "X" as the UAV's assigned marker). The UAV may then orient itself to land at the landing area 810*a* corresponding to the assigned marker. The marker may or may not be used to aid the UAV in positioning itself on the landing area. The UAV may then land on the landing area (e.g., by descending).

In some embodiments, the other visual markers may be assigned to other UAVs. For example, a second UAV may be assigned an "O" marker and may land at the corresponding landing area 810*b*. Multiple UAVs may be able to land at the battery station in parallel. In some instances, a single UAV may land at each landing area. Each UAV may be assigned its corresponding marker and may land accordingly.

In some embodiments, GPS technology may be used to guide a UAV to a zone. The GPS technology may be used in addition to, or instead of, the visual markers. Real time kinematic (RTK) technology may be provided as a precise GPS technology that may be able to provide guidance with a high level of precision. In some instances, RTK GPS technology may provide distance information to within um-level, mm-level, cm-level, few cm-level, ten cm-level, thirty cm-level, fifty cm-level, or meter level accuracy. A pair of GPS sensors may work simultaneously to provide the precise navigation. In some instances, a first GPS sensor may be provided at a station and a second GPS sensor may be provided on the UAV. Optionally, the first GPS sensor may be provided at a landing zone of the station. In some instances, different landing zones of a station may have their own GPS sensor. A first GPS sensor may be provided on a fixed reference point (e.g., landing zone of station) and a second GPS sensor may be provided on a mobile object (e.g., UAV). Two GPS data communication through a differential signal may permit calculation of the relative position of the fixed reference point and mobile objects. Thus, a UAV may be able to navigate to specific landing zones based on the GPS data (with or without the aid of the visual sensing described herein).

Figure 9:
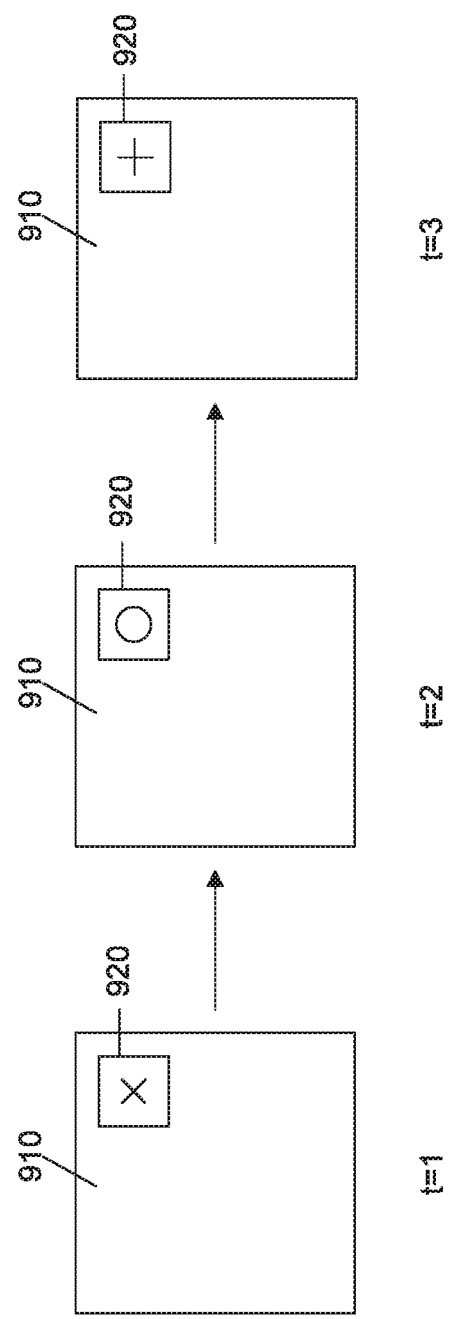
FIG. 9 shows a landing area with a landing marker that may change over time in accordance with an embodiment of the invention.

FIG. 9 shows a landing area with a landing marker that may change over time in accordance with an embodiment of the invention. A landing area 910 may have a marker 920. In some instances, the marker may be a visual marker. The marker may be a static marker (e.g., remain the same). The marker may be a dynamic marker (e.g., change over time). The marker may change over time (e.g., t=1, t=2, t=3). For example, if the marker is a visual marker, the image shown by the marker may change (e.g., progress from "X" to "O" to "+").

When a multi-zone battery station is provided, each of the landing areas may have its own marker. Each marker may optionally change over time. For example, if a multi-zone battery station has five landing areas, each of the landing areas may have its own marker, and each marker may change over time. The markers of the different landing areas may be able to change independently of one another. For example, the different markers may change in accordance with their own schedule. Alternatively, changing of one or more markers may be synchronized with changing of one or more other markers.

A multi-zone battery station may have a controller. The controller may include one or more processors and one or more memory units. The memory units may comprise non-transitory computer readable media comprising code, logic, or instructions for performing one or more steps. The processors may, individually or collectively, execute the one or more steps in accordance with the non-transitory computer readable media. The controller may send a signal to the marker to change. The controller may send a signal to the marker comprising data about the marker's output. For example, for a visual marker, the data may include information about the marker image or symbol (e.g., bar code or QR code) to be outputted, or a pattern or sequence of lights to be outputted. In another example, the data may include information about a frequency or other characteristics of a vibration or audio signal to be outputted.

In some embodiments, a battery station controller may receive data that may include information transmitted from a UAV. For example, the UAV may transmit information about the UAV's proximity to the battery station or location relative to the battery station. The UAV may optionally transmit information about the UAV's battery, UAV's mission or flight path, or any other information. The controller may determine location and/or timing for the UAV to land on the battery station. The controller may determine which landing area for the UAV to land. The controller may also determine when the UAV can land at the specified landing area. When the time comes for the UAV to land at the specified landing area, the marker on the landing area may be altered or maintained to match the assigned marker for the UAV. The UAV may then detect the assigned marker and be able to land at the landing area.

For example, a first UAV may be assigned an "O" marker. When a marker on the landing area switches from an "X" to an "O" at time=2, the first UAV may land at the landing area. The battery life of the first UAV may be reloaded while the UAV is at the landing area. For example, the battery of the UAV may be recharged or exchanged for another battery. The UAV may then take off from the landing area. A second UAV may be assigned a "+" marker. When the first UAV has taken off from the landing area, the marker may switch to the "+." The second UAV may then land at the landing area. In some instances, a predetermined amount of time may pass after the first UAV has taken off from the landing area before switching the marker to give the first UAV sufficient time to clear the battery station and reduce the likelihood of a collision between the first UAV and the second UAV.

A marker may change over time in any manner. In some instances, a marker may be displayed on a screen or other type of display. For example, a marker may be displayed on an LED screen, LCD screen, plasma screen, or any other type of screen. The marker may include one or more lights that may turn on or off, or change color over time. The marker may include various wireless signals that may change over time. In some instances, the marker may include audio signals that may change over time.

Figure 10:
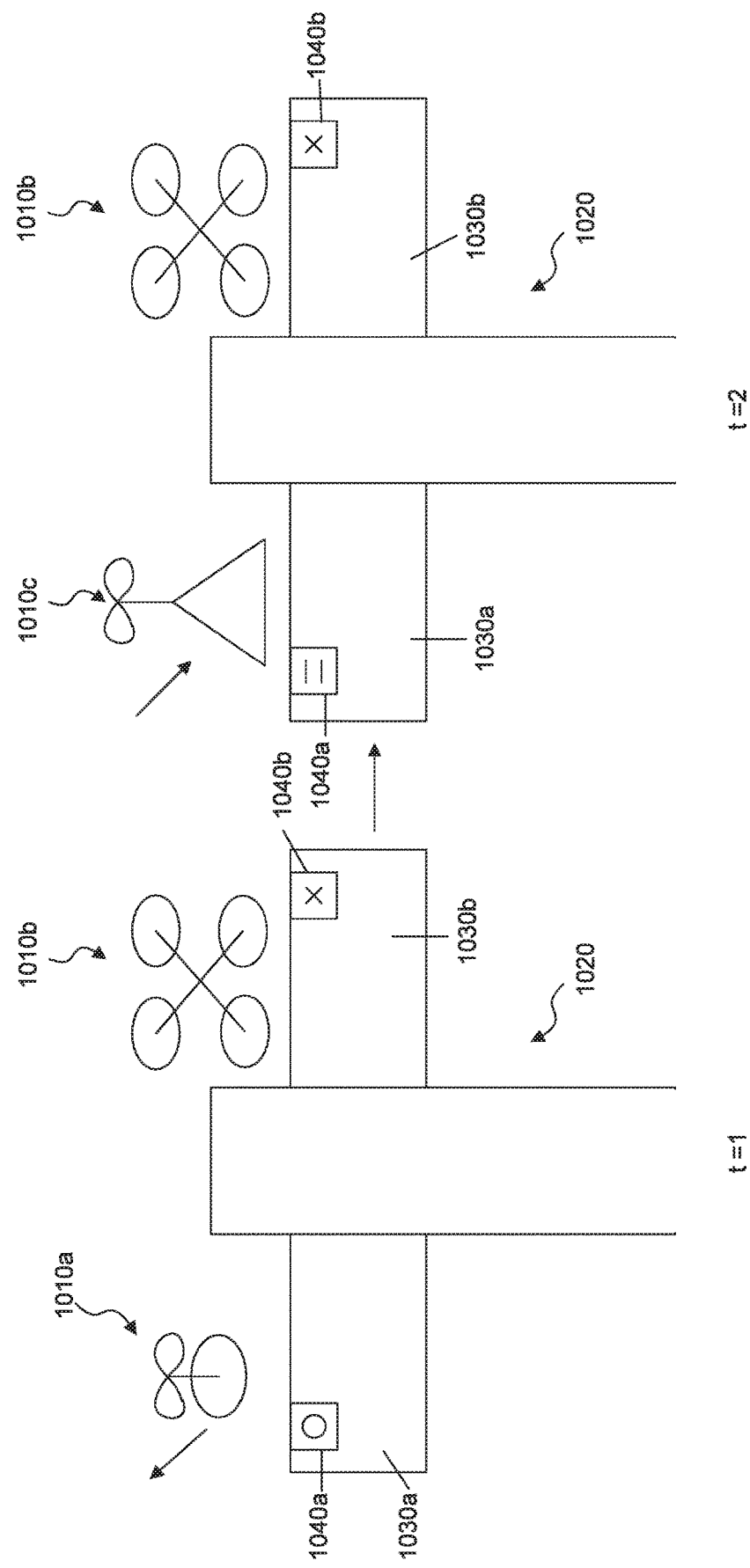
FIG. 10 shows an example of UAV flight traffic on a multi-zone battery station in response to a change from a landing marker in accordance with an embodiment of the invention.

FIG. 10 shows an example of UAV flight traffic on a multi-zone battery station in response to a change from a landing marker in accordance with an embodiment of the invention. A first UAV 1010*a* and a second UAV 1010*b* may be capable of landing on a multi-zone battery station 1020. The multi-zone battery station may include a first landing zone 1030*a* and a second landing zone 1030*b*. The first landing zone may include a first marker 1040*a* and a second landing zone may include a second marker 1040*b*. The second marker may be different from the first marker. The second marker may be visually distinguishable from the first marker, and vice versa.

The first UAV 1010*a* and the second UAV 1010*b* may land at the battery station 1020. In some instances, the UAVs may be at the station to reload battery life. The UAVs may reload battery life by recharging their batteries or exchanging their batteries for other batteries. The first UAV may be configured to land when a first marker 1040*a* becomes apparent. The second UAV may be configured to land when a second marker 1040*b* becomes apparent. The markers may remain while the UAVs are at the landing zones. Alternatively, once the UAVs have landed at their respective landing zones, the markers may no longer need to be apparent.

When a first UAV 1010*a* has completed its task, it may take off from its landing zone 1030*a* (e.g., as illustrated at t=1). After the first UAV has taken off, the marker 1040*a* of the first landing zone may change. The marker may change in response to detecting that the UAV has taken off. Detection that the UAV has taken off may be provided using one or more sensors of the battery station. Alternatively, the UAV may send a signal indicating that the UAV has been taken off. The marker may change in response to detecting that a new UAV is approaching to replace the UAV that has taken off. The detection of the new UAV may occur using one or more sensors on-board the battery station, or in response to information sent from the new UAV. A third UAV 1010*c* may detect the new marker and may land at the first landing zone accordingly (e.g., as illustrated at t=2). Meanwhile, activity at the second landing zone 1030*b* may be occurring independently of the first landing zone. For example, the first UAV may leave and the third UAV may land while the second UAV 1010*b* is having battery life reloaded at the second landing zone.

Figure 15:
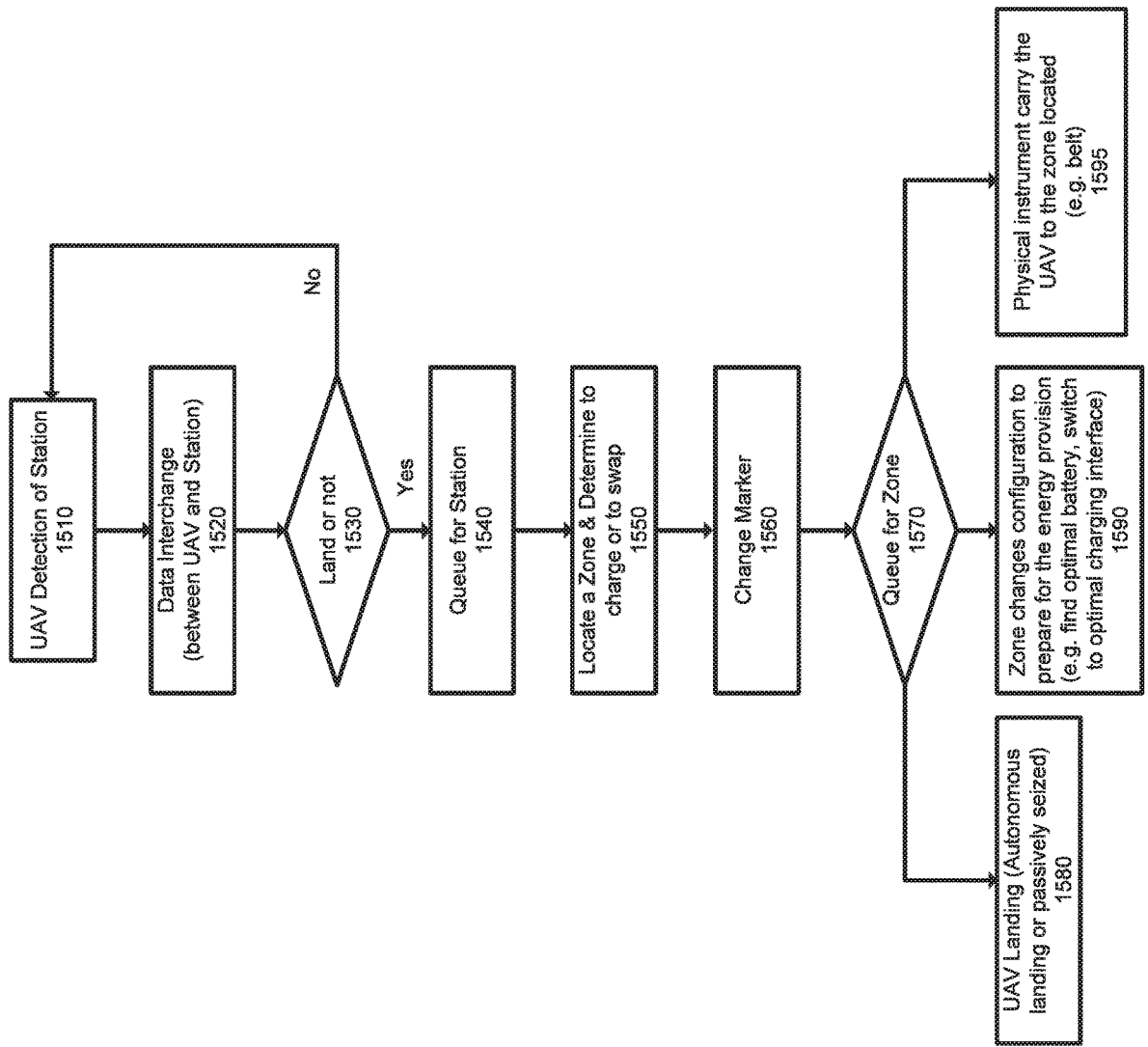
FIG. 15 shows an example of a landing process for a multi-zone battery station in accordance with an embodiment of the invention.

FIG. 15 shows an example of a landing process for a multi-zone battery station in accordance with an embodiment of the invention. A UAV may detect a station 1510 and data may be interchanged between the UAV and the station 1520. A determination may be made for the UAV to land at the station or not 1530. If it is determined that the UAV is not to land at the station, the UAV may continue on its mission, and may optionally encounter another station 1510. If it is determined that the UAV is to land at the station, the UAV's position in a queue for landing at the station 1540 may be determined. A zone of the station may be located and energy provision rules (e.g., charging the battery or exchanging the battery for another battery) 1550 may be determined. When a zone frees up, a marker associated with the zone may be changed 1560. The queue may be updated in response to the zone freeing up 1570. A UAV may land at the freed zone 1580. The zone may maintain or change configuration for the determined energy provision to the UAV 1590. Optionally, a physical instrument, such as a queuing region may be used to carry the UAV to the location of the zone 1595.

During the energy provision process, a UAV may detect a station 1510. The UAV may be in flight and the presence of the station may be detected by the UAV. GPS or other location systems may be used to provide the location of the station to the UAV. The UAV may or may not receive data in advance of getting close to station. For example, a UAV may be aware of battery stations over a wide area. Alternatively, the UAV may be made aware of the station's presence when the UAV is local to the station. In some instances, detection of the station may also be made with vision sensors or other types of sensors.

A data interchange 1520 may occur between the UAV and the battery station. For example, the UAV may transmit information to the station regarding the state of the battery on board the UAV, the current flight conditions, time or distance remaining on current mission, distance to the next station, battery specifications, state of battery charge (e.g. remaining power estimate, battery voltage, current integration), battery temperature, UAV specifications, or flight plan (e.g. estimated arrival at the next station and/or estimated time of arrival at final destination). The UAV may also communicate information to the station describing the state of the UAV. For example the UAV may communicate information describing system failures or descriptions of damaged parts (e.g. broken propeller) to the station. The UAV may carry a payload. The UAV may communicate the weight of the pay load. Additionally the UAV may communicate to the station when in the flight plan the UAV plans to load or unload the payload.

In response to information from the UAV or independent of communication from the UAV the battery station may communicate information to the UAV. The station may inform the UAV as to whether or not it is available to provide the UAV with a charged battery. For example, the station may be depleted of charged batteries or one or more zones of the station may be occupied by another UAV. A determination may be made whether the UAV will land at the station or not 1530. In some of these instances, the station may instruct the UAV to continue on to the next station. In another case the station may instruct the UAV to continue to the next closest station in the case of adverse weather conditions (e.g. wind, rain, snow) or a mechanical or electrical failure on the station. The station may transmit updated route instruction to the UAV to direct the UAV to the next station. Alternatively, when the station is available for charging, the station may instruct the UAV to land on the station. In some instances, the station may instruct the UAV to land when the UAV status is bad (e.g., damaged part, such as a propeller). The station may instruct the UAV to land at the station when the station is part of the UAV's flight plan as a location in which to land. If other stations ahead on the flight plan are full or likely to be occupied, or the weather is adverse at the other station locations, the UAV may be instructed to land at the station. If the UAV can get energy from the station (e.g., the UAV is capable of receiving energy via one or more zones of the station), then the UAV may be instructed to land at the station. This may or may not take occupancy into account and/or UAV formats and/or battery formats. If the power remaining on the UAV battery is less than or equal to the energy needed to support the flight of the UAV to the next destination (e.g., next station or final destination) safely, then the UAV may be instructed to land at the station.

If it is determined that the UAV is to land at the station, the UAV's position in a queue for landing at the station 1540 may be determined. The UAV's sequence in the station queue may be determined by one or more factors. In some instances, one or more layers may be used to determine the UAV's sequence, as previously described. Optionally, as previously described, the UAVs may be ranked by a score, which may be a weighted average of one or more, two or more, three or more four or more, or five or more factors, which may include any of factors previously mentioned herein.

A zone of the station may be located and energy provision rules (e.g., charging the battery or exchanging the battery for another battery) 1550 may be determined. A UAV may send information to a station, including any information described elsewhere herein. For example, the UAV may send information about the UAV weight, length, battery type, charge interface (e.g., configuration, dimension, location), or any other information pertaining to the UAV or the battery of the UAV. The UAV may also send information about any timing constraints (e.g., urgency of mission, whether it needs to take off immediately).

The station may use information sent by the UAV to select a zone for the UAV. For instance, the station may estimate time to charge and time to swap batteries, and choose the energy provision method that takes the shortest amount of time. A threshold state of charge may or may not be considered in determining the energy provision method to use. In some instances, time amount of estimated time for multiple methods may be evaluated. The method utilizing the shortest amount of time may be used. One or more zones of the station may be evaluated to determine whether they can provide energy to the UAV using a selected energy provision method. In some instances, multiple zones may be evaluated. Optionally, multiple zones may be found that match the energy provision needs or preferences of the UAV. Of the zones that may match the energy provision needs or preferences of the UAV, one or more of the zones may be evaluated to determine occupancy. In some instances, in addition to energy provision needs, physical requirements of the UAV may be considered. For example, the zones may be evaluated to determine whether they fit the dimensions or format of the UAV. An unoccupied zone may be found. Alternatively, if all zones are occupied, then the UAV may wait its turn until a matching zone becomes unoccupied.

When a matching zone frees up, a marker associated with the zone may be changed 1560. In some instances, the station may directly send flight plan parameters to the UAV. For example, RTK GPS or other navigational techniques may be used to guide the UAV directly to a freed zone. Alternatively, a visual marker may be used. The marker can show a pattern, and the UAV may find a zone with the matching pattern to land, as described elsewhere herein. The marker can show a QR code, or other type of visual pattern, and may contain 3D flying parameters for the UAV to fly to the zone.

When the marker shows a visual pattern, every zone of the station can have a marker. The marker may or may not be flash. The located zone may flash the correct pattern for the UAV to land. In some embodiments, there may be a queuing region, as previously described. There may be a marker at the queuing region. The marker at the queuing region may tell the UAV the pattern to match, and then the UAV may find a zone with the same pattern. Optionally, the marker displayed at the queuing region may calibrate or identify to the UAV which visual pattern to match at the selected zone. The marker being displayed at the queuing region may optionally indicate to the UAV that the corresponding zone has been freed up.

When the marker shows a QR code, or similar code, the zones of the battery station may have a marker. The marker may or may not flash. The located zone may flash the QR code. The QR code may be indicative of parameters for the UAV to the fly to approach the located zone. In some instances, there may be a queuing region as previously described. There may be a QR code at the queuing region. The QR code at the queuing region may tell the UAV how to find a zone. Optionally, there may be only markers displayed at the queuing region without requiring markers at the zones. The markers displayed to a UAV at the queuing region may direct the UAV to the proper zone. For example, a relative flight path from the queuing region to the proper zone may be provided. The QR code may be unique to the zone to which to direct the UAV, rather than to the UAV itself.

The queue may be updated in response to a zone freeing up 1570. As previously described, the UAV may be directed to the proper zone using any location techniques and/or visual markers.

A UAV may land at the freed zone 1580. The UAV may land directly at the freed zone without first landing at any other portion of the station. Alternatively, the UAV may land at another region of the station, such as a queuing region. The queuing region may direct the UAV to the zone. The queuing region may indicate to the UAV how to fly to the zone, identify the zone, or directly convey the UAV to the zone. The UAV may actively or passively land at the zone. In some instances, a robotic arm or other active landing assist mechanism may be provided.

The zone may maintain or change configuration for the determined energy provision to the UAV 1590. This may occur prior, concurrently with, or after the UAV arrives at the zone. In some instances, an energy provision method for a UAV may be determined ahead of time for the UAV. This may result in updating a configuration of the zone to follow the energy provision method. For example, if a battery is to be charged on-board the UAV, a charger may extend to meet the UAV. In another example, if a battery is to be removed from the UAV and/or exchanged, a battery replacement member may be extended and/or prepared to remove the battery from the UAV.

Optionally, a physical instrument, such as a queuing region may be used to carry the UAV to the location of the zone 1595. For example, the queuing region may be a conveyor belt or similar mechanism that may transport the UAV to the zone. The UAV may rest on a surface, within a receptacle, or within a dent to be conveyed to the zone. The UAV may remain on its location on the queuing region with the aid of gravity and/or friction, magnets, hook and loop fasteners, interlocking pieces, covers, sides, or any other mechanism that may aid in transporting the UAV to its destination zone.

Battery charging may occur on-board a battery station. This may include on-board charging of one or more UAV batteries at one or more zones. This may also include charging of one or more batteries in a battery storage unit of the battery station. Multiple batteries (whether on-board a UAV or stored in the battery station) may be simultaneously charged. In some instances, the base station may permit simultaneously charging of multiple or all of these batteries. In some instances, the base station may prioritize charging. In some instances one or more of the batteries may be charged first while the other batteries are not charged. This may enable more rapid charging of the higher priority batteries. For example, if a UAV lands at a zone, the on-board battery of the UAV may be charged and the charging of the batteries in the battery storage unit of the battery station may be put on hold or reduced. Similarly, within the battery storage unit, some batteries may be charged to a full state of charge first while others may remain in a partially or completely depleted state. Charging of the various batteries may be controlled to provide desired speed of battery charging. In some instances, charging may occur in a manner to prolong battery life. In other instances, charging may occur to maximize energy efficiency, or reduce energy usage.

Figure 11:
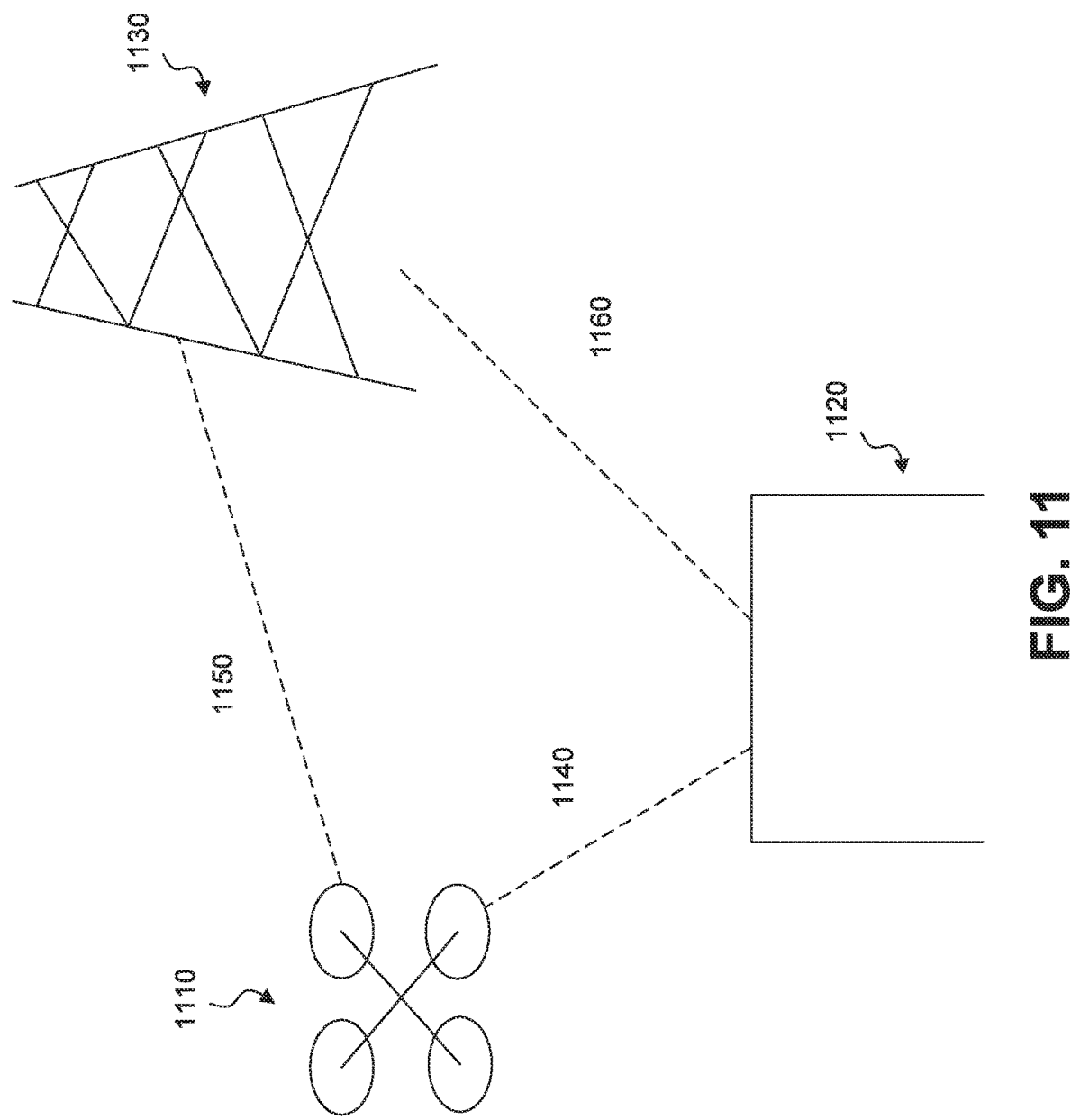
FIG. 11 shows examples of direct and indirect communications between a UAV and a battery station in accordance with an embodiment of the invention.

FIG. 11 shows examples of direct and indirect communications between a UAV and a battery station in accordance with an embodiment of the invention. A UAV 1110 may communicate with a battery station 1120. In some instances, direct communication 1140 may be provided between the UAV and the battery station. In other instances, indirect communications 1150, 1160 may occur between the UAV and the battery station, with the aid of one or more intermediary device 1130.

The UAV 1110 may wirelessly communicate with a battery station 1120. The wireless communication may include data from the UAV to the battery station and/or data from the battery station to the UAV. In some instances, the data from the battery station to the UAV may include commands that may control the operation of the UAV. Data from the battery station may include information about a marker of a landing area of the battery station or information about a landing area upon which the UAV may land. The UAV may be capable of taking off from the battery station and/or landing on the battery station. Data from the UAV to the battery station may include information about the UAV's battery (e.g., state of charge, capacity, size, form factor, chemistry, specification), the UAV (e.g., UAV type, form factor, size, specification), or mission of the UAV (e.g., predetermined flight path, distance left to travel).

In some instances, the UAV 1110 may communicate with the battery station 1120 directly. A direct communication link 1140 may be established between the UAV and the companion vehicle. The direct communication link may remain in place while the UAV is in motion. Any type of direct communication may be established between the UAV and the battery station. For example, WiFi, WiMax, COFDM, Bluetooth, IR signals, directional antennas or any other type of direct communication may be employed. Any form of communication that occurs directly between two objects may be used or considered.

In some instances, direct communications may be limited by distance. Direct communications may be limited by line of sight, or obstructions. Direct communications may permit fast transfer of data, or a large bandwidth of data compared to indirect communications.

Indirect communications may be provided between the UAV 1110 and the battery station 1120. Optionally, indirect communications may include one or more intermediary device 1130 between the battery station and the external device. In some examples the intermediary device may be a satellite, router, tower, relay device, or any other type of device. Communication links may be formed between a UAV and the intermediary device 1150 and communication links may be formed between the intermediary device and the battery station 1160. Any number of intermediary devices may be provided, which may communicate with one another. In some instances, indirect communications may occur over a network, such as a local area network (LAN) or wide area network (WAN), such as the Internet. In some instances, indirect communications may occur over a cellular network, data network, or any type of telecommunications network (e.g., 3G, 4G). A cloud computing environment may be employed for indirect communications.

In some instances, indirect communications may be unlimited by distance, or may provide a larger distance range than direct communications. Indirect communications may be unlimited or less limited by line of sight or obstructions. In some instances, indirect communications may use one or more relay device to aid in direct communications. Examples of relay devices may include, but are not limited to satellites, routers, towers, relay stations, or any other type of relay device.

A method for providing communications between an unmanned aerial vehicle and a battery station may be provided, where the communication may occur via an indirect communication method. The indirect communication method may comprise communication via a mobile phone network, such as a 3G or 4G mobile phone network. The indirect communications may use one or more intermediary devices in communications between the battery station and the UAV. The indirect communication may occur when the UAV is in motion.

Any combination of direct and/or indirect communications may occur between different objects. In one example, all communications may be direct communications. In another example, all communications may be indirect communications. Any of the communication links described and/or illustrated may direct communication links or indirect communication links. In some implementations, switching between direct and indirect communications may occur. For example, communication between a battery station and a UAV may be direct communication, indirect communication, or switching between different communication modes may occur. Communication between any of the devices described (e.g., battery station, UAV) and an intermediary device (e.g., satellite, tower, router, relay device, central server, computer, tablet, smartphone, or any other device having a processor and memory) may be direct communication, indirect communication, or switching between different communication modes may occur.

In some instances, the switching between communication modes may be made automatically without requiring human intervention. One or more processors may be used to determine to switch between an indirect and direct communication method. For example, if quality of a particular mode deteriorates, the system may switch to a different mode of communication. The one or more processors may be on board the battery station, on board the UAV, on board a third external device, or any combination thereof. The determination to switch modes may be provided from the UAV, the battery station, and/or a third external device.

In some instances, a preferable mode of communication may be provided. If the preferable mode of communication is inoperational or lacking in quality or reliability, then a switch may be made to another mode of communication. The preferable mode may be pinged to determine when a switch can be made back to the preferable mode of communication. In one example, direct communication may be a preferable mode of communication. However, if the UAV flies too far away, or obstructions are provided between the UAV and the battery station, the communications may switch to an indirect mode of communications. In some instances, direct communications may be preferable when a large amount of data is transferred between the UAV and the battery station. In another example, an indirect mode of communication may be a preferable mode of communication. If the UAV and/or battery station needs to quickly transmit a large amount of data, the communications may switch to a direct mode of communications. In some instances, direct communications may be preferable when the UAV is flying at significant distances away from the battery station and greater reliability of communication may be desired.

Switching between communication modes may occur in response to a command. The command may be provided by a user. The user may be an operator of the battery station. The user may be an individual controlling the UAV.

In some instances, different communication modes may be used for different types of communications between the UAV and the battery station. Different communication modes may be used simultaneously to transmit different types of data.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
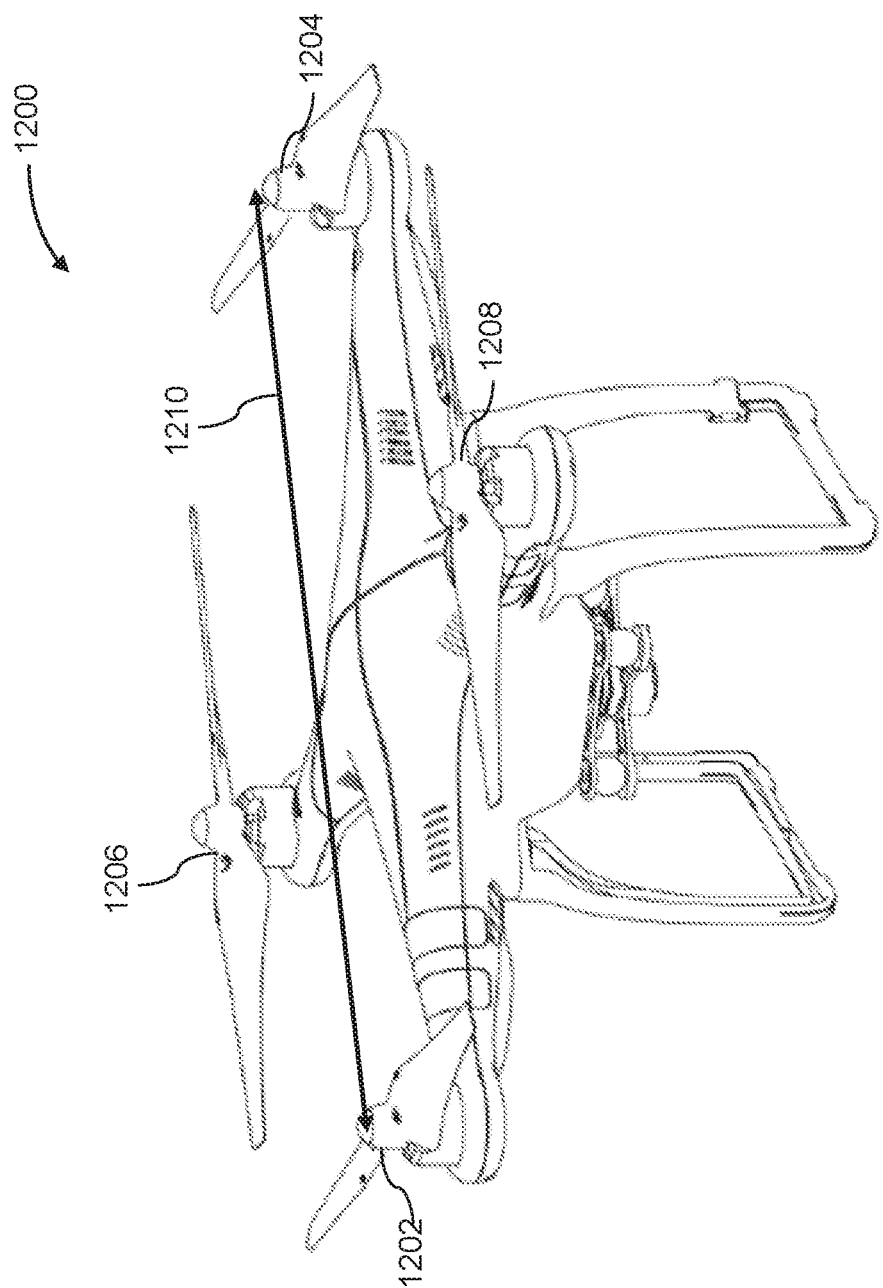
FIG. 12 illustrates an unmanned aerial vehicle, in accordance with an embodiment of the invention.
Figure 13:
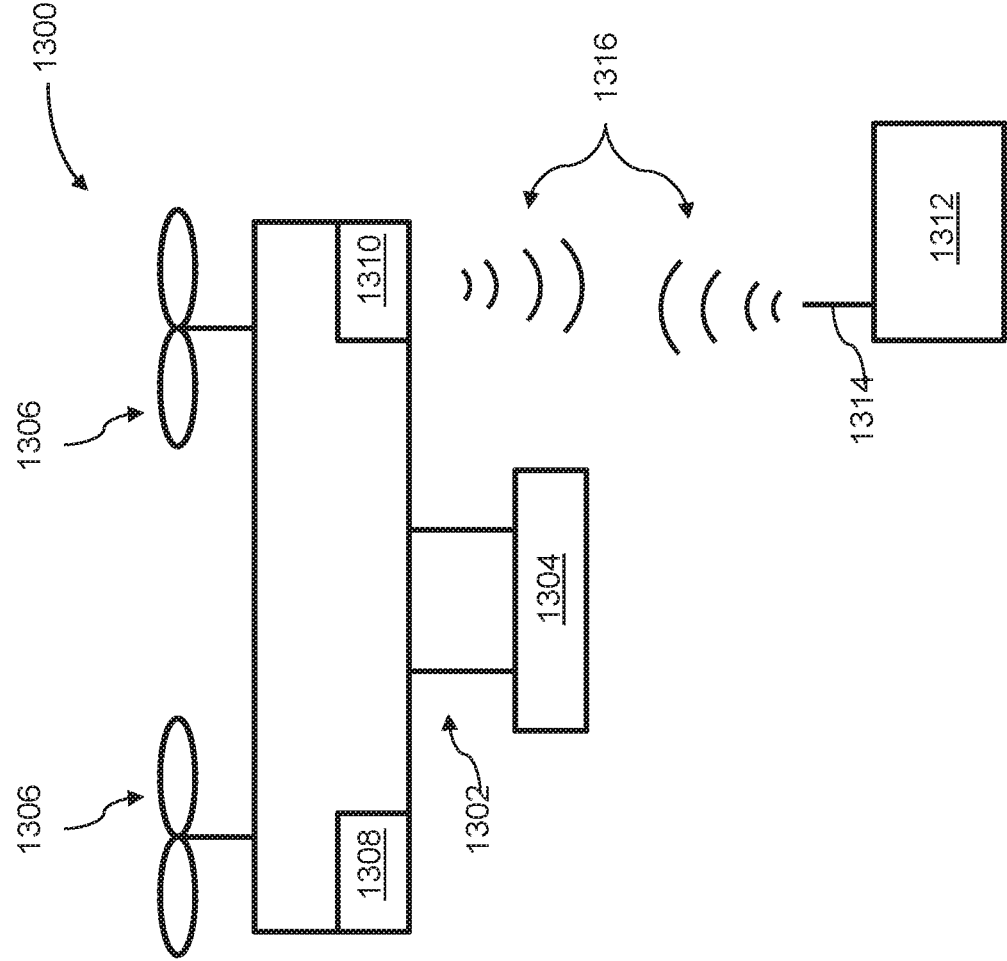
FIG. 13 illustrates a movable object including a carrier and a payload, in accordance with an embodiment of the invention.

FIG. 12 illustrates an unmanned aerial vehicle (UAV) 1200, in accordance with embodiments of the present invention. The UAV may be an example of a movable object as described herein. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1210. For example, the length 1210 can be less than or equal to 2 m, or less than equal to 5 m. In some embodiments, the length 1210 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

FIG. 15 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1710 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

Figure 14:
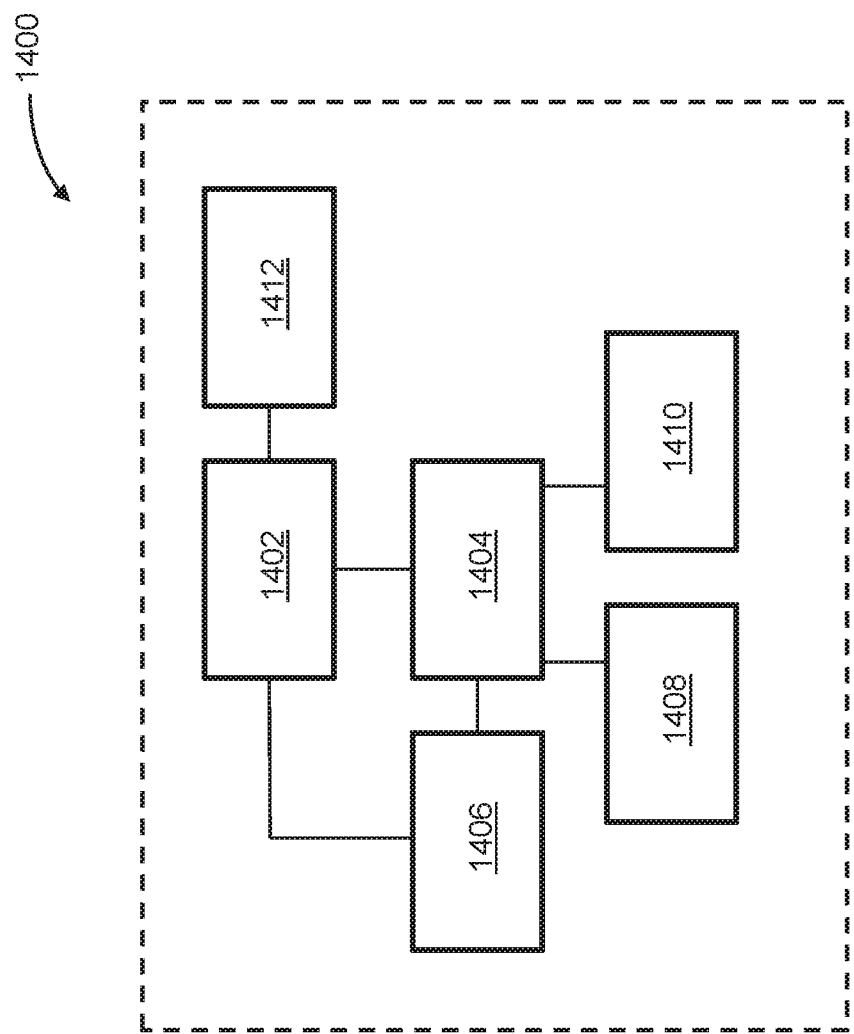
FIG. 14 is a schematic illustration by way of block diagram of a system for controlling a movable object, in accordance with an embodiment of the invention.

FIG. 14 is a schematic illustration by way of block diagram of a system 1400 for controlling a movable object, in accordance with embodiments. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 1408 configured to control a state of the movable object. For example, the control module 1408 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for directing a UAV to a landing area of a UAV energy provision station, said method comprising:
    acquiring, with aid of one or more processors and from a plurality of sensors, sensor data related to the UAV, the sensor data including a state of the UAV and a state of a battery on board the UAV;
    determining, with aid of the one or more processors according to the state of the UAV and the state of the battery, whether the UAV is to (1) land at the UAV energy provision station, or (2) continue on to another location without landing at the UAV energy provision station to enable the UAV to fly for an extended period of time or for an extended distance: and
    in response to determining that the UAV is to land at the UAV energy provision station, and with aid of the one or more processors:
        determining, in response to sensing that the UAV is in proximity of the energy provision station, a position in a UAV queue for the UAV to land at the energy provision station;
        selecting a UAV landing area from a plurality of UAV landing areas for the UAV to land, wherein the selected UAV landing area is configured to reload energy on the UAV;
        displaying, in response to the selected UAV landing area being prepared to accept the UAV, a visual marker at the selected UAV landing area, the visual marker containing 3D flying parameters for the UAV to fly to the selected UAV landing area; and
    controlling, according to the 3D flying parameter contained in the visual marker, the UAV to correctly fly to the selected UAV landing area.

2. The method of claim 1, wherein the one or more processors are on board the energy provision station or on board the UAV.

3. The method of claim 2, wherein the position in the UAV queue is determined with aid of one or more processors on board the energy provision station.

4. The method of claim 1, further comprising exchanging data between the UAV and the energy provision station prior to determining whether the UAV is to (1) land, or (2) continue.

5. The method of claim 4, wherein the data exchanged comprises one or more of the following: the state of the battery, flight conditions, time or distance remaining on a mission for the UAV, distance to another energy provision station, UAV specifications, the state of the UAV, or information pertaining to a payload on board the UAV.

6. The method of claim 4, wherein the UAV queue comprises a plurality of UAVs, the position in the UAV queue is determined based on the data exchanged between the UAV and the energy provision station.

7. The method of claim 6, wherein the position in the UAV queue is determined based on a priority of mission of the UAV in relation to a priority of a mission of another UAV in the queue.

8. The method of claim 1, wherein the selected UAV landing area is configured to reload energy on the UAV by (1) recharging a battery on board the UAV, or (2) exchanging the battery on board the UAV with another battery from the energy provision station.

9. The method of claim 8, wherein the energy provision station comprises at least one battery storage unit configured to store and charge the other battery.

10. The method of claim 1, further comprising maintaining the configuration of the selected UAV landing area for arrival of the UAV.

11. The method of claim 1, further comprising altering the configuration of the selected UAV landing area for arrival of the UAV.

12. The method of claim 1, further comprising updating the queue when the UAV is directed to the selected UAV landing area.

13. The method of claim 1, wherein the UAV waits in a queuing region of the selected UAV landing area, and the queuing region is conveyor belt.

14. The method of claim 1, wherein:
the UAV queue includes a plurality of UAVs; and
determining the position of the UAV in the UAV queue includes:
obtaining a priority ranking of the UAV among the plurality of UAVs by calculating weighted average of scores of the UAV in a plurality of layers having a plurality of corresponding weights, wherein the plurality of layers including a first layer corresponding to the state of the UAV, a second layer corresponding to the state of the battery, and third layer corresponding to a waiting time of the UAV, a first weight of the first layer being larger than a second weight of the second layer and a third weight of the third layer; and
determining the position of the UAV in the UAV queue according to the priority ranking of the UAV.

15. The method of claim 1, wherein selecting the UAV landing area includes:
selecting the UAV landing area from the plurality of UAV landing areas for the UAV to land according to the position of the UAV in the UAV queue, an availability of each of the plurality of UAV landing areas, and at least one of a type of the UAV, a type of the battery, a state of charge of the battery, mission information of the UAV, or energy provision rules of the UAV.

16. A method for directing a UAV to a landing area of a UAV energy provision station, said method comprising:
acquiring, with aid of one or more processors and from a plurality of sensors, sensor data related to the UAV, the sensor data including a state of the UAV and a state of a battery on board the UAV;
determining, with aid of the one or more processors according to the state of the UAV and the state of the battery, whether the UAV is to (1) land at the UAV energy provision station, or (2) continue on to another location without landing at the UAV energy provision station;
in response to determining that the UAV is to land at the UAV energy provision station, and with aid of the one or more processors:
determining a position in a UAV queue for the UAV to land at the energy provision station;
selecting a UAV landing area from a plurality of UAV landing areas for the UAV to land, wherein the selected UAV landing area is configured to reload energy on the UAV; and
controlling the UAV to fly to the selected UAV landing area in response to the selected UAV landing area being prepared to accept the UAV; and
in response to detecting the UAV by a sensor located on a robotic arm at the UAV energy provision station, controlling the robotic arm to seize the UAV from the air to precisely place the UAV to a predetermined location in the selected landing area for battery life reloading.

* * * * *